US012794585B2

(12) United States Patent
Yu

(10) Patent No.: US 12,794,585 B2
(45) Date of Patent: Nov. 10, 2026

(54) EXTREMELY HIGH THROUGHPUT LINK ADAPTATION CONTROL INFORMATION TRANSMISSION METHOD AND RELATED APPARATUS

(71) Applicant: HUAWEI TECHNOLOGIES CO., LTD., Shenzhen (CN)

(72) Inventor: Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/458,652

(22) Filed: Aug. 30, 2023

(65) Prior Publication Data

US 2023/0412300 A1 Dec. 21, 2023

Related U.S. Application Data

(63) Continuation of application No. PCT/CN2022/078549, filed on Mar. 1, 2022.

(30) Foreign Application Priority Data

Mar. 3, 2021 (CN) ........................ 202110234960.4

(51) Int. Cl.
*H04L 1/00* (2006.01)
*H04L 27/34* (2006.01)

(52) U.S. Cl.
CPC .......... *H04L 1/0003* (2013.01); *H04L 27/345* (2013.01)

(58) Field of Classification Search
CPC ... H04L 1/0003; H04L 1/0009; H04L 1/0023; H04L 1/0026; H04L 1/0025; H04L 1/0027; H04L 5/0092; H04L 5/66; H04L 27/345
See application file for complete search history.

(56) References Cited

U.S. PATENT DOCUMENTS

2018/0123727 A1 5/2018 Yu et al.
2020/0214036 A1 7/2020 Min et al.
(Continued)

FOREIGN PATENT DOCUMENTS

CN 111096044 A * 5/2020 ............ H04W 72/21
CN 111726193 A 9/2020
EP 3934140 A1 1/2022
JP 2020141304 A 9/2020
(Continued)

OTHER PUBLICATIONS

Jin, Ding-qi, CN-111096044-English, May 1, 2020 (Year: 2020).*
(Continued)

*Primary Examiner* — Jianye Wu
(74) *Attorney, Agent, or Firm* — HAUPTMAN HAM, LLP

(57) ABSTRACT

In the technical solution provided in this application, a control subfield in a first message sent by a data receiver to a data transmitter includes one or more of the following fields: an EHT indication subfield, a number of spatial streams subfield, an EHT-MCS subfield, and an MSI subfield. One or more of the number of spatial streams subfield, the EHT-MCS subfield, and the MSI subfield meet the following conditions: A number of bits occupied by the MSI subfield is less than or equal to 2, a maximum number of spatial streams that can be indicated by the number of spatial streams subfield is greater than 8, and an MCS indicated by the EHT-MCS subfield includes one or more of the following: 4096-QAM, BPSK-DCM, and BPSK-DCM-DUP.

20 Claims, 8 Drawing Sheets

(56) References Cited

U.S. PATENT DOCUMENTS

| | | | | |
|---|---|---|---|---|
| 2021/0298114 A1* | 9/2021 | Nam | H04W 52/028 |
| 2022/0030604 A1* | 1/2022 | Noh | H04W 72/121 |
| 2022/0353025 A1* | 11/2022 | Gan | H04L 5/0007 |
| 2023/0269695 A1* | 8/2023 | Thomas | H04L 5/0051 455/456.1 |

FOREIGN PATENT DOCUMENTS

| | | |
|---|---|---|
| JP | 2020182180 A | 11/2020 |
| WO | 2020217612 A1 | 10/2020 |
| WO | 2022171164 A1 | 8/2022 |

OTHER PUBLICATIONS

IEEE Std 802.11a-1999,Supplement to IEEE Standard for Information technology,Telecommunications and information exchange between systems,Local and metropolitan area networks Specific requirements,Part 11: Wireless LAN Medium Access Control(MAC) and Physical Layer (PHY) specifications:High-speed Physical Layer in the 5 GHZ Band,Approved Sep. 16, 1999,total 90 pages.

Yujin Noh (Newracom) et a.,Proposed Draft Text:Parameters for EHT-MCSs,doc.:IEEE 802.11-20/1290r3, IEEE P802.11 Wireless LANs,Sep. 11, 2020,total 12 pages.

IEEE Std 802.11g™-2003 (Amendment to IEEE Std 802.11™, 1999 Edition (Reaff 2003),IEEE Standard for Information technology Telecommunications and information exchange between systems Local and metropolitan area networks Specific requirements Part 11: Wireless LAN Medium Access Control (MAC) and Physical Layer (PHY) specifications Amendment 4: Further Higher Data Rate Extension in the 2.4 GHz Band,Jun. 27, 2003,total 78 pages.

IEEE Std 802.11n-2009,Part 11:Wireless LAN Medium Access Control (MAC) and Physical Layer (PHY) Specifications,Amendment 5: Enhancements for Higher Throughput,dated Sep. 11, 2009,total 536 pages.

Arooba Zeshan et al."VLC with 802.11ac Frame Structure",doc.: 11-20-0196-00-bb,Jan. 15, 2020,total 9 pages.

IEEE Std 802.11b-1999, Supplement to IEEE Standard forInformation technology Telecommunications and information exchange between systems Local and metropolitan area networks Specific requirements Part 11: Wireless LAN Medium Access Control (MAC) and Physical Layer (PHY) specifications: Higher-Speed Physical Layer Extension in the 2.4 GHz Band, Sep. 16, 1999, total 97 pages.

IEEE P802.11ax™/D8.0, Oct. 2020, Part 11: Wireless LAN Medium Access Control (MAC) and Physical Layer (PHY) Specifications,Amendment 1: Enhancements for High Efficiency WLAN,total 820 pages.

Bo Gong et al.,IEEE P802.11 Wireless LANs,EHT-SIG CR on P802.11be D0.3—part 5,doc.:IEEE 802.11-21/0338r0,Mar. 1, 2021,total 5 pages.

Japanese Office Action issued in corresponding Japanese Application No. 2023-553180, dated Sep. 10, 2024, pp. 1-19.

Australian Examination Report issued in corresponding Australian Application No. 2022228408, dated May 22, 2024, pp. 1-3.

Extended European Search Report issued in corresponding European Application No. 22762507.6, dated Jun. 24, 2024, pp. 1-10.

Cailian Deng et al,IEEE 802.11be Wi-Fi 7: New Challenges and Opportunities, IEEE Communications Surveysand Tutorials, Jul. 29, 2020,total 31 pages.

Chinese Office Action issued in corresponding Chinese Application No. 202310731228.7, dated Dec. 11, 2023, pp. 1-9.

* cited by examiner

| Number of bytes | 2 | 2 | 6 | 0 or 6 | 0 or 6 | 0 or 2 | 0 or 6 | 0 or 2 | 0 or 4 | Variable | 4 |
|---|---|---|---|---|---|---|---|---|---|---|---|
| | Frame control | Duration/ Identifier | Address 1 | Address 2 | Address 3 | Sequence control | Address 4 | Quality of service control | High throughput control | Frame body | Frame check sequence |

FIG. 1

EXTREMELY HIGH THROUGHPUT LINK ADAPTATION CONTROL INFORMATION TRANSMISSION METHOD AND RELATED APPARATUS

CROSS-REFERENCE TO RELATED APPLICATIONS

This application is a continuation of International Patent Application No. PCT/CN2022/078549, filed on Mar. 1, 2022, which claims priority to Chinese Patent Application No. 202110234960.4, filed on Mar. 3, 2021. The disclosures of the aforementioned applications are hereby incorporated by reference in their entireties.

TECHNICAL FIELD

This application relates to the field of wireless communication technologies, and in particular, to an extremely high throughput (EHT) link adaptation (LA) control information transmission method and a related apparatus.

BACKGROUND

A physical layer of a wireless local area network (WLAN) supports a link adaptation technology. A main process of the link adaptation technology is as follows: A transmitter sends data to a receiver by using a specific modulation and coding scheme (MCS); then because there is impact of a channel condition and the receiver can estimate actual channel status information, the receiver receives the data, calculates, based on the channel condition and a sending condition (for example, an MCS), parameters such as a recommended MCS and a channel condition-related parameter, and feeds back the parameters to the transmitter; and after obtaining the parameters fed back by the receiver, the transmitter adjusts and selects a proper MCS to reduce a bit error rate of data transmission. This process of adjusting the MCS at the transmitter based on modulation and coding scheme feedback (MFB) of the receiver is a typical link adaptation technology.

In a conventional technology, in the high efficiency (HE) standard (802.11ax standard), a high efficiency link adaptation (HLA) control subfield is used to carry and indicate control information, to perform channel feedback for link adaptation. In a new standard, for example, the EHT standard (802.11be standard), a channel parameter requirement changes, that is, control information changes, for example, a number of space-time streams (NSTSs) changes. Therefore, how to implement indication of link adaptation control information in the new standard becomes an urgent problem to be resolved.

SUMMARY

This application provides an extremely high throughput link adaptation control information transmission method and a related apparatus, to implement transmission of link adaptation control information in the 802.11be standard and standards after the 802.11be standard.

According to a first aspect, this application provides an extremely high throughput EHT link adaptation LA control information transmission method. The method includes: sending a first message. The first message includes a control field. The control field includes a control subfield. The control subfield includes one or more of the following fields: an EHT indication subfield, a number of spatial streams subfield, an EHT-modulation and coding scheme MCS subfield, and an MCS request sequence identifier MSI subfield. The EHT indication subfield indicates that the control subfield is a control field of EHT LA control information. The number of spatial streams subfield indicates a recommended number of spatial streams. The EHT-MCS subfield indicates a recommended EHT-MCS. The MSI subfield indicates an MCS request sequence. One or more of the number of spatial streams subfield, the EHT-MCS subfield, and the MSI subfield meet the following conditions: A number of bits occupied by the MSI subfield is less than or equal to 2, a maximum number of spatial streams that can be indicated by the number of spatial streams subfield is greater than 8, and an MCS indicated by the EHT-MCS subfield includes one or more of the following: 4096-quadrature amplitude modulation QAM, binary phase shift keying BPSK-dual carrier modulation DCM, and BPSK-DCM-duplication DUP.

In this method, a data receiver sends the first message to a data transmitter. The control subfield in the first message includes one or more of the following fields: the EHT indication subfield, the number of spatial streams subfield, the EHT-MCS subfield, and the MSI subfield. One or more of the number of spatial streams subfield, the EHT-MCS subfield, and the MSI subfield meet the following conditions: The number of bits occupied by the MSI subfield is less than or equal to 2, the maximum number of spatial streams that can be indicated by the number of spatial streams subfield is greater than 8, and the MCS indicated by the EHT-MCS subfield includes one or more of the following: the 4096-QAM, the BPSK-DCM, and/or the BPSK-DCM-DUP. This implements transmission of link adaptation control information in the 802.11be standard and standards after the 802.11be standard.

In a possible implementation, the method further includes: receiving a second message. The second message includes a control field. The control field in the second message includes a control subfield. The control subfield in the second message includes one or more of the following fields: an EHT indication subfield, a bandwidth indication subfield, and a resource unit allocation indication subfield. The bandwidth indication subfield indicates a bandwidth applicable to the recommended EHT-MCS. The resource unit allocation indication subfield indicates a resource unit RU applicable to the recommended EHT-MCS.

The bandwidth indicated by the bandwidth indication subfield is 320 megahertz, and/or the resource unit indicated by the resource unit allocation indication subfield includes one or more of the following resource units: an MRU including a 52-tone RU and a 26-tone RU, an MRU including a 106-tone RU and a 26-tone RU, an MRU including a 484-tone RU and a 242-tone RU, an MRU including a 996-tone RU and a 484-tone RU, an MRU including two 996-tone RUs and a 484-tone RU, an MRU including three 996-tone RUs, an MRU including three 996-tone RUs and a 484-tone RU, and an RU including four 996-tone RUs.

In this implementation, before the data receiver sends the first message to the data transmitter, the data receiver receives the second message sent by the data transmitter, and the data receiver sends the first message to the data transmitter based on the second message. A control subfield in the second message includes one or more of the following fields: an EHT indication subfield, a bandwidth indication subfield, and a resource unit allocation indication subfield. The bandwidth indicated by the bandwidth indication subfield is 320 megahertz, and/or the resource unit indicated by the resource unit allocation indication subfield includes one or more of the following resource units: an MRU including a 52-tone RU and a 26-tone RU, an MRU including a 106-tone RU and a 26-tone RU, an MRU including a 484-tone RU and a 242-tone RU, an MRU including a 996-tone RU and a 484-tone RU, an MRU including two 996-tone RUs and a 484-tone RU, an MRU including three 996-tone RUs, an MRU including three 996-tone RUs and a 484-tone RU, and an RU including four 996-tone RUs. This implements solicited transmission of link adaptation control information in the 802.11be standard and standards after the 802.11be standard.

In a possible implementation, the control subfield in the first message and the control subfield in the second message each further include an unsolicited MCS feedback subfield. The unsolicited MCS feedback subfield indicates that a message carrying the unsolicited MCS feedback subfield is a solicited feedback message.

The first message further includes an MCS request subfield, and the MCS request subfield indicates that the first message is a message for responding to EHT LA feedback.

The second message further includes an MCS request subfield, and the MCS request subfield in the second message indicates that the second message is a message for requesting the EHT LA feedback.

In this implementation, the control subfield in the first message and the control subfield in the second message each further include the unsolicited MCS feedback subfield and the MCS request subfield. In the first message, if the unsolicited MCS feedback subfield is set to 0 and the MCS request subfield is set to 1, the first message is the message for responding to the EHT LA feedback. In the second message, if the unsolicited MCS feedback subfield is set to 0 and the MCS request subfield is set to 0, the second message is the message for requesting the EHT LA feedback. This implements solicited transmission of link adaptation control information.

In a possible implementation, the one or more of the following fields further include: the EHT indication subfield, a bandwidth indication subfield, a resource unit allocation indication subfield, and a physical layer protocol data unit PPDU parameter subfield. The bandwidth indication subfield indicates a bandwidth applicable to the recommended EHT-MCS. The resource unit allocation indication subfield indicates a resource unit RU applicable to the recommended EHT-MCS. The PPDU parameter subfield indicates a type of a PPDU for parameter estimation.

One or more of the bandwidth indication subfield, the resource unit allocation indication subfield, and the PPDU parameter subfield meet the following conditions:

The bandwidth indicated by the bandwidth indication subfield is 320 megahertz, and the PPDU indicated by the PPDU parameter subfield includes one or more of the following: an EHT multi-user MU PPDU and an EHT trigger-based TB PPDU.

The resource unit indicated by the resource unit allocation indication subfield includes one or more of the following resource units: an MRU including a 52-tone RU and a 26-tone RU, an MRU including a 106-tone RU and a 26-tone RU, an MRU including a 484-tone RU and a 242-tone RU, an MRU including a 996-tone RU and a 484-tone RU, an MRU including two 996-tone RUs and a 484-tone RU, an MRU including three 996-tone RUs, an MRU including three 996-tone RUs and a 484-tone RU, and an RU including four 996-tone RUs.

In this implementation, the control subfield in the first message further includes an EHT indication subfield, a bandwidth indication subfield, a resource unit allocation indication subfield, and a PPDU parameter subfield. One or more of the bandwidth indication subfield, the resource unit allocation indication subfield, and the PPDU parameter subfield meet the following conditions: the bandwidth indicated by the bandwidth indication subfield is 320 megahertz, and the PPDU indicated by the PPDU parameter subfield includes one or more of the following: the EHT multi-user MU PPDU and the EHT trigger-based TB PPDU. The resource unit indicated by the resource unit allocation indication subfield includes one or more of the following resource units: the MRU including the 52-tone RU and the 26-tone RU, the MRU including the 106-tone RU and the 26-tone RU, the MRU including the 484-tone RU and the 242-tone RU, the MRU including the 996-tone RU and the 484-tone RU, the MRU including the two 996-tone RUs and the 484-tone RU, the MRU including the three 996-tone RUs, the MRU including the three 996-tone RUs and the 484-tone RU and the RU including the four 996-tone RUs. This implements transmission of link adaptation control information in the 802.11be standard and standards after the 802.11be standard.

In a possible implementation, the control subfield in the first message further includes an unsolicited MCS feedback subfield, and the unsolicited MCS feedback subfield indicates that a message carrying the unsolicited MCS feedback subfield is an unsolicited feedback message.

In this implementation, the control subfield in the first message further includes the unsolicited MCS feedback subfield. If the unsolicited MCS feedback subfield is set to 1, the first message is the unsolicited feedback message. This implements unsolicited transmission of link adaptation control information.

In a possible implementation, a number of bits occupied by the PPDU parameter subfield is 2.

In a possible implementation, the PPDU parameter subfield further indicates a coding type, the type of the PPDU occupies 1 bit, and the coding type occupies 1 bit.

In a possible implementation, the PPDU parameter subfield and the MSI subfield are a same subfield in the control subfield.

In a possible implementation, a number of bits occupied by the PPDU parameter subfield is 3.

In a possible implementation, the PPDU parameter subfield further indicates a coding type, the type of the PPDU occupies 2 bits, and the coding type occupies 1 bit.

In a possible implementation, a number of bits occupied by the bandwidth indication subfield is 3.

In a possible implementation, a number of bits occupied by the resource unit allocation indication subfield is 7, 8, or 9.

In a possible implementation, the resource unit allocation indication subfield indicates the applicable resource unit by using a bitmap.

In a possible implementation, a number of bits occupied by the number of spatial streams subfield is 3, and the number of spatial streams indicated by the number of spatial streams subfield is any one of 1, 2, 4, 6, 8, 12, 16, and another reserved number of spatial streams.

In a possible implementation, a number of bits occupied by the number of spatial streams subfield is 4, and the number of spatial streams indicated by the number of spatial streams subfield is any one of 1 to 16.

In a possible implementation, a number of bits occupied by the EHT-MCS subfield is 4 or 5.

In a possible implementation, the EHT indication subfield and an HE indication subfield are a same subfield in the control subfield, the control subfield further includes a differentiation indication subfield, and the differentiation indication subfield indicates that the same subfield is the EHT indication subfield or the HE indication subfield.

In a possible implementation, a number of bits occupied by the control subfield is not greater than 26.

According to a second aspect, this application provides an extremely high throughput link adaptation control information transmission apparatus. The apparatus may include modules configured to implement the method in the first aspect, and these modules may be implemented by software and/or hardware.

According to a third aspect, this application provides an extremely high throughput link adaptation control information transmission apparatus. The apparatus may include a processor coupled to a memory. The memory is configured to store program code, and the processor is configured to execute the program code in the memory, to implement the method in any one of the first aspect or the implementations of the first aspect.

Optionally, the apparatus may further include the memory.

According to a fourth aspect, this application provides a chip. The chip includes at least one processor and a communication interface. The communication interface and the at least one processor are interconnected through a line. The at least one processor is configured to run a computer program or instructions, to perform the method in any one of the first aspect, the second aspect, or the possible implementations thereof.

According to a fifth aspect, this application provides a computer-readable medium. The computer-readable medium stores program code to be executed by a device, and the program code is used to perform the method in any one of the first aspect or the possible implementations of the first aspect.

According to a sixth aspect, this application provides a computer program product including instructions. When the computer program product runs on a computer, the computer is enabled to perform the method in any one of the first aspect or the possible implementations of the first aspect.

According to a seventh aspect, this application provides a communication system. The communication system includes the transmission apparatus described in the second aspect.

BRIEF DESCRIPTION OF DRAWINGS

FIG. 1 is a schematic diagram of a MAC frame format in the 802.11 standard;

DESCRIPTION OF EMBODIMENTS

Figure 2:
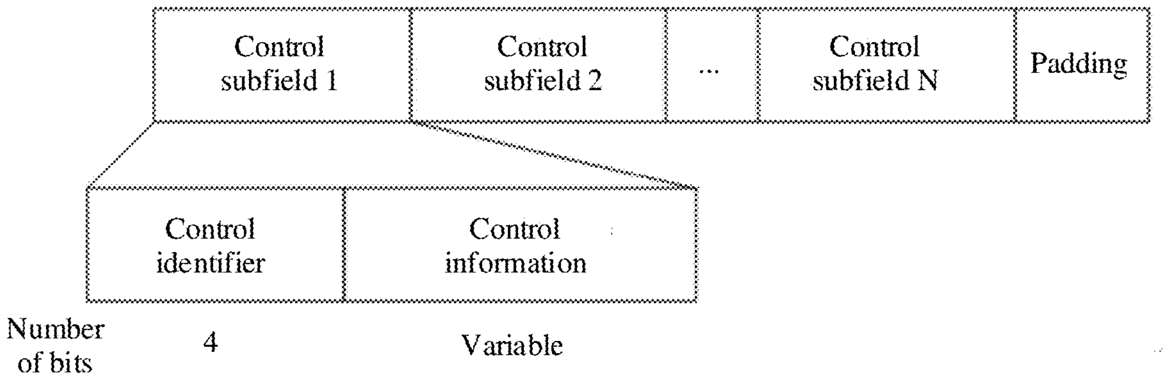
FIG. 2 is a schematic diagram of a structure of an A-control subfield.

In wireless communication, a channel condition may change due to influence of a plurality of factors. For example, a wireless channel may change based on factors such as a path loss, shadowing, fading, noise, and interference. A transmitter for wireless communication selects different MCSs based on different channel conditions, to achieve a compromise between a transmission success rate and a high transmission rate, thereby improving overall throughput of a system.

To select a proper MCS, the transmitter learns of the channel condition to a specific extent, such as a signal-to-noise ratio (SNR) of a channel. Therefore, after performing channel sounding, a receiver sends control information such as a recommended MCS and an NSTS to the transmitter.

In a WLAN, an access point (AP) and a station (STA) transmit control signaling, management signaling, or data by using a medium access control (MAC) protocol data unit (MPDU), or a MAC frame for short.

FIG. 1 is a schematic diagram of a MAC frame format in the 802.11 standard. As shown in FIG. 1, an MPDU includes a frame header, a frame body, and a frame check sequence (FCS). The frame header includes frame control, duration/identification information, corresponding address information (an address 1, an address 2, an address 3, and an address 4), sequence control information, quality of service control information, and high throughput control information. The frame body is used to carry data or management information and control information transmitted from an upper layer. The frame check sequence is used to check whether the MPDU is correctly transmitted. A number of bytes of the frame control is 2, a number of bytes of the duration/identification information is 2, a number of bytes of the address 1 is 6, a number of bytes of the address 2 is 0 or 6, a number of bytes of the address 3 is 0 or 6, a number of bytes of the sequence control is 0 or 2, a number of bytes of the address 4 is 0 or 6, a number of bytes of the quality of service control information is 0 or 2, a number of bytes of the high throughput control information is 0 or 4, a number of bytes of the frame body is variable, and a number of bytes of the frame check sequence is 4.

In the high throughput control (HT control) field in the MAC frame header, the transmitter may transmit some control information. An aggregated control (A-control) subfield in a high efficiency variant (including a high throughput variant, a very high throughput variant, and a high efficiency variant) of the high throughput control field is a structure of one or more control identifiers plus control information, and may be used to carry 1 to N pieces of control information.

FIG. 2 is a schematic diagram of a structure of an A-control subfield. As shown in FIG. 2, one A-control subfield includes N control subfields and a padding part, where N is a positive integer. Each control subfield includes a control identifier and control information. The control identifier indicates a type of the control information. A number of bits occupied by the control identifier is 4, and a number of bits occupied by the control information is variable.

Figure 3:
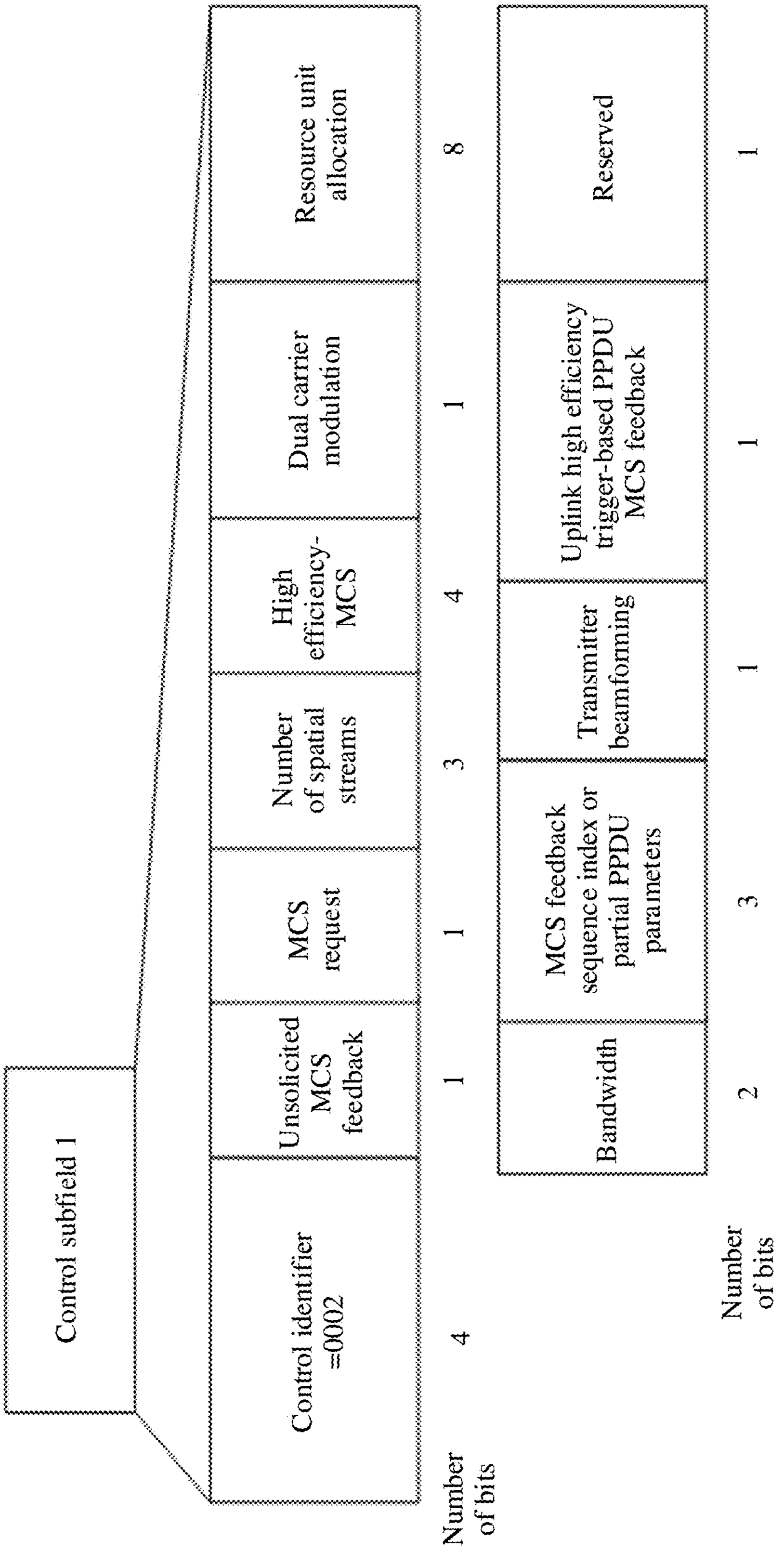
FIG. 3 is a schematic diagram of an HLA control subfield.

In the conventional technology, there is a method applicable to the 802.11ax standard and used for transmitting link adaptation control information based on the MAC frame format. FIG. 3 is a schematic diagram of an HLA control subfield. As shown in FIG. 3, names of control information in the HLA control subfield and numbers of occupied bits are included. As shown in FIG. 3, the control information in the HLA control subfield 1 includes a control identifier (control ID), unsolicited MCS feedback (unsolicited MFB), an MCS request (MRQ), a number of spatial streams (NSS), a high efficiency-MCS (HE-MCS), dual carrier modulation (DCM), resource unit allocation (RU allocation), a bandwidth (BW), an MCS feedback sequence index or partial PPDU parameters (MSI/partial PPDU parameters), transmitter beamforming (Tx beamforming), uplink high efficiency trigger-based PPDU MCS feedback (UL HE TB PPDU MFB), and reserved. When the control identifier is 2, A-control includes only one HLA control subfield, and control information in the HLA control subfield occupies all 26 bits (except a 4-bit control identifier).

However, compared with the 802.16ax standard, the 802.0be standard supports a larger bandwidth and a larger number of spatial streams, and therefore, the link adaptation control information in the conventional technology is no longer applicable to the 802.11be standard and standards after the 802.11be standard.

A WLAN starts from the 802.11a/g standard, and goes through the 802.11n standard, the 802.11ac standard, the currently discussed 802.11ax standard, and the next-generation 802.11be standard of the 802.11ax standard. Table 1 shows transmission bandwidths, numbers of space-time streams, and coding and modulation schemes that are allowed by these standards.

TABLE 1

| Standard name | 802.11a/g | 802.11n (HT) | 802.11ac (VHT) | 802.11ax (HE) | 802.11be (EHT) |
|---|---|---|---|---|---|
| Bandwidth | 20 megahertz (MHz) | 20 MHz, 40 MHZ | 20 MHz, 40 MHz, 80 MHz, 160 MHz | 20 MHz, 40 MHz, 80 MHz, 160 MHz | 20 MHz, 40 MHz, 80 MHz, 160 MHz, 320 MHz |
| Number of space-time streams | 1 | 1 to 4 | 1 to 8 | 1 to 8 | 1 to 16 |
| Coding and modulation | Binary phase shift keying (BPSK) to 64-quadrature amplitude modulation (QAM) | BPSK to 64-QAM | BPSK to 256-QAM | BPSK to 1024-QAM | BPSK to 4096-QAM |
| Supported maximum data rate | 54 Mbit/s (Mbps) | 600 Mbps | 6.9 Gbps | 9.6 Gbps | 46.08 Gbps |

The 802.11n standard is referred to as high throughput (HT), the 802.11ac standard is referred to as very high throughput (VHT), the 802.11ax standard is referred to as high efficiency (HE), and the 802.11be standard is referred to as extremely high throughput (EHT).

This application provides an extremely high throughput link adaptation control information transmission method for the 802.11be standard and standards after the 802.11be standard.

Figure 4:
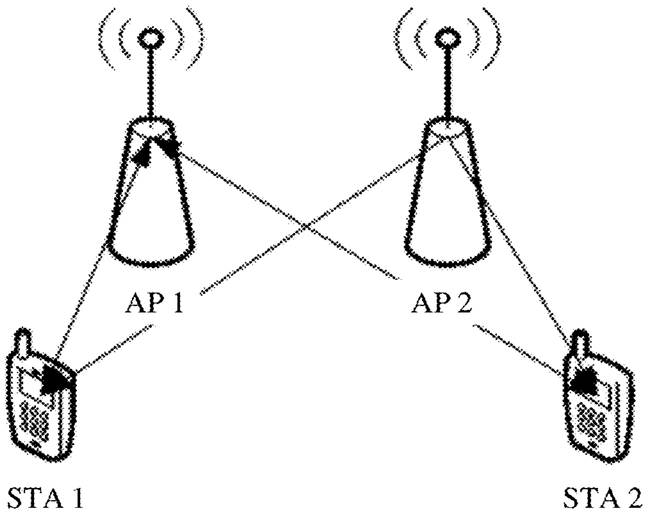
FIG. 4 is a schematic diagram of an application scenario according to an embodiment of this application.

FIG. 4 is a schematic diagram of an application scenario according to an embodiment of this application. This application is applicable to data communication between one or more communication devices and one or more communication devices. For example, this application is applicable to communication between an AP and a STA, communication between APs, communication between STAs, and the like. The AP and the STA each may be a communication server, a router, a switch, a bridge, a computer, a mobile phone, or the like. This is not limited in this application.

It may be understood that the scenario in FIG. 4 is merely an example, and the technical solution in this application may be further applied to another scenario provided that the scenario involves data communication between communication devices.

Figure 5:
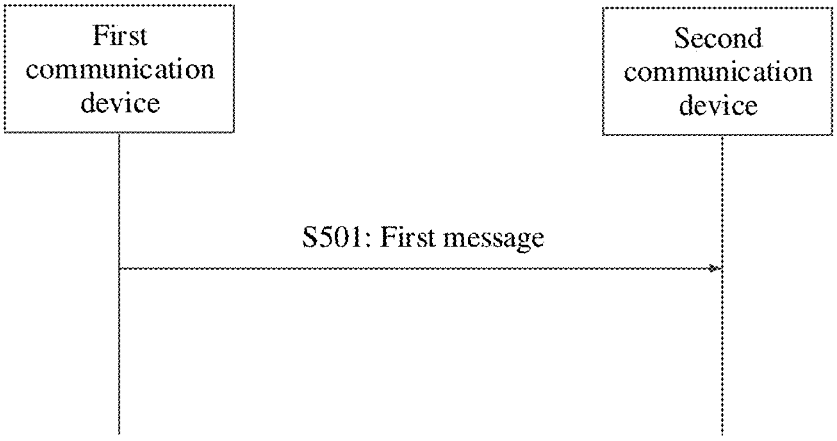
FIG. 5 is a schematic flowchart of an EHT LA control information transmission method according to an embodiment of this application.

FIG. 5 is a schematic flowchart of an EHT LA control information transmission method according to an embodiment of this application. As shown in FIG. 5, the method includes at least S501.

S501: A first communication device sends a first message to a second communication device.

The first communication device is a data receiver, and the second communication device is a data transmitter. The first communication device sends the first message to the second communication device. The first message includes a control field. The control field includes a control subfield. The control subfield includes one or more of the following fields: an EHT indication subfield, a number of spatial streams subfield, an EHT-MCS subfield, and an MCS request sequence identifier (MSI) subfield. The EHT indication subfield indicates that the control subfield is a control field of EHT LA control information. The number of spatial streams subfield indicates a number of spatial streams recommended by the first communication device. The EHT-MCS subfield indicates an EHT-MCS recommended by the first communication device. The MSI subfield indicates an MCS request sequence.

One or more of the number of spatial streams subfield, the EHT-MCS subfield, and the MSI subfield meet the following conditions: A number of bits occupied by the MSI subfield is less than or equal to 2, a maximum number of spatial streams that can be indicated by the number of spatial streams subfield is greater than 8, and an MCS indicated by the EHT-MCS subfield includes one or more of the following: 4096-QAM, BPSK-dual carrier modulation (dual carrier modulation DCM), and BPSK-DCM-duplication (duplication, DUP).

For example, the MSI subfield may include any integer from 0 to 3, and each integer indicates a specific EHT-MCS feedback request. A number of bits occupied by the MSI subfield may be 2.

For example, the number of spatial streams subfield may indicate any one of numbers of spatial streams 1 to 16, or may indicate any one of numbers of spatial streams 1, 2, 4, 6, 8, 12, and 16 and another reserved number of spatial streams. Optionally, a number of bits occupied by the number of spatial streams subfield is 3 or 4.

In a possible implementation, when a number of spatial streams indicated by the number of spatial streams subfield is any one of 1, 2, 4, 6, 8, 12, 16, and another reserved number of spatial streams, a number of bits occupied by the number of spatial streams subfield may be 3.

In another possible implementation, when a number of spatial streams indicated by the number of spatial streams subfield is any one of 1 to 16, a number of bits occupied by the number of spatial streams subfield may be 4.

For example, the EHT-MCS subfield may include any integer from 0 to 15, where 0 indicates BPSK and a bit rate (R) 1/2; 1 indicates QSPK and R 1/2; 2 indicates QPSK and R 3/4; 3 indicates 16-QAM and R 1/2; 4 indicates 16-QAM and R 3/4; 5 indicates 64-QAM and R 2/3; 6 indicates 64-QAM and R 3/4; 7 indicates 64-QAM and R 5/6; 8 indicates 256-QAM and R 3/4; 9 indicates 256-QAM and R 5/6; 10 indicates 1024-QAM and R 3/4; 11 indicates 1024-QAM and R 5/6; 12 indicates 4096-QAM and R 3/4; 13 indicates 4096-QAM and R 5/6; 14 indicates BPSK-DCM-DUP and R 1/2; and 15 indicates BPSK-DCM and R 1/2.

15 indicates the BPSK with the DCM. When the EHT-MCS subfield indicates 0 or 15, a same or similar function as the DCM in the HLA may be implemented. 14 indicates that the DUP transmission is further introduced based on the BPSK-DCM.

Optionally, a number of bits occupied by the EHT-MCS subfield may be 4 or 5.

Optionally, before the first communication device sends the first message to the second communication device, the second communication device may send a second message to the first communication device. Correspondingly, the first communication device receives the second message sent by the second communication device.

The second message includes a control field. The control field in the second message includes a control subfield. The control subfield in the second message may include one or more of the following fields: an EHT indication subfield, a bandwidth indication subfield, and a resource unit allocation indication subfield. The bandwidth indication subfield indicates a bandwidth applicable to the EHT-MCS recommended by the first communication device. The resource unit allocation indication subfield indicates a resource unit (RU) applicable to the EHT-MCS recommended by the first communication device.

The bandwidth indicated by the bandwidth indication subfield is 320 megahertz (MHz), and/or the resource unit indicated by the resource unit allocation indication subfield includes one or more of the following resource units: a 52+26-tone multi-resource unit (multiple resource unit, MRU), a 106+26-tone MRU, a 484+242-tone MRU, a 996+484-tone MRU, a 2×996+484-tone MRU, a 3×996-tone MRU, a 3×996+484-tone MRU, and a 4×996-tone resource unit (resource unit, RU).

For example, a number of bits occupied by the bandwidth indication subfield may be 3. The bandwidth indication subfield may include any integer from 0 to 4. All integers from 0 to 4 may respectively correspond to 20 MHz, 40 MHz, 80 MHz, 160 MHz, and 320 MHz in sequence. The rest bits may be reserved bits.

Optionally, if an unsolicited MCS feedback subfield is set to 1 and a UL EHT TB PPDU MFB subfield is set to 0, the bandwidth indication subfield may indicate the bandwidth for the EHT-MCS recommended when a PPDU is sent to the second communication device.

Optionally, if an unsolicited MCS feedback subfield is set to 0 and an MCS request subfield is set to 1, the bandwidth indication subfield may indicate a bandwidth indicated when the second communication device requests feedback. For example, if the unsolicited MCS feedback subfield in the second message is set to 0 and the MCS request subfield is set to 1, the bandwidth indication subfield may indicate the bandwidth indicated when the second communication device requests feedback.

Optionally, if an unsolicited MCS feedback subfield is set to 1 and a UL EHT TB PPDU MFB subfield is set to 1, the bandwidth indication subfield may indicate a bandwidth applicable to the EHT-MCS recommended when the second communication device sends an EHT TB PPDU.

In a possible implementation, the control subfield in the first message and the control subfield in the second message each may further include an unsolicited MCS feedback subfield. The unsolicited MCS feedback subfield indicates that a message carrying the unsolicited MCS feedback subfield is a solicited feedback message.

The first message may further include an MCS request subfield, and the MCS request subfield indicates that the first message is a message for responding to EHT LA feedback.

The second message may further include an MCS request subfield, and the MCS request subfield in the second message indicates that the second message is a message for requesting the EHT LA feedback.

For example, a number of bits occupied by the unsolicited MCS feedback subfield may be 1. A value 1 may indicate that EHT LA control is unsolicited MFB. A value 0 may indicate that EHT LA control is an MCS request or solicited MCS feedback.

For example, a number of bits occupied by the MCS request subfield may be 1. When the unsolicited MCS feedback indicates 0 and the MCS request subfield indicates 1, it indicates requesting the EHT LA feedback. When the unsolicited MCS feedback indicates 0 and the MCS request subfield indicates 0, it indicates responding to the EHT LA feedback. When the unsolicited MCS feedback indicates 1, the MCS request subfield is reserved.

In another possible implementation, the control subfield in the first message may include an unsolicited MCS feedback subfield, and the unsolicited MCS feedback subfield indicates that a message carrying the unsolicited MCS feedback subfield is an unsolicited feedback message.

In this case, the control subfield in the first message may further include one or more of the following fields: the EHT indication subfield, a bandwidth indication subfield, a resource unit allocation indication subfield, and a physical layer protocol data unit (PPDU) parameter subfield. The bandwidth indication subfield indicates a bandwidth applicable to the EHT-MCS recommended by the first communication device. The resource unit allocation indication subfield indicates an RU applicable to the EHT-MCS recommended by the first communication device. The PPDU parameter subfield indicates a type of a PPDU for parameter estimation.

Optionally, the EHT indication subfield and an HE indication subfield may be a same subfield in the control subfield.

Optionally, when a control identifier in the control subfield is 2, the control subfield may further include a differentiation indication subfield, and the differentiation indication subfield indicates that the same subfield is the EHT indication subfield or the HE indication subfield. A number of bits occupied by the EHT indication subfield may be 1. 0 may indicate that the same subfield is a subfield corresponding to HLA, and 1 may indicate that the same subfield is a subfield corresponding to EHT LA.

Optionally, when a control identifier in the control subfield is any integer in 2 or 7 to 14, the control subfield may not include a differentiation indication subfield, but the control identifier is used to differentiate whether the control subfield is a control subfield corresponding to HLA or a control subfield corresponding to EHT LA.

For example, when the control identifier is 2, it indicates that the control subfield is the control subfield corresponding to the HLA; or when the control identifier is any integer from 7 to 14, it indicates that the control subfield is the control subfield corresponding to the EHT LA.

One or more of the bandwidth indication subfield, the resource unit allocation indication subfield, and the PPDU parameter subfield may meet the following conditions:

The bandwidth indicated by the bandwidth indication subfield is 320 megahertz, and the PPDU indicated by the PPDU parameter subfield includes one or more of the following: an EHT multi-user (MU) PPDU and an EHT trigger-based (TB) PPDU.

Optionally, a number of bits occupied by the PPDU parameter subfield may be 2 or 3.

In a possible implementation, the number of bits occupied by the PPDU parameter subfield is 2. The PPDU parameter subfield indicates a type of a PPDU and a coding type. The PPDU may include an EHT MU PPDU and an EHT TB PPDU. The coding type may include binary convolutional coding (BCC) and low-density parity check coding (LDPC). The type of the PPDU may occupy 1 bit, and the coding type may occupy 1 bit.

For example, 0 indicates the EHT MU PPDU, and 1 indicates the EHT TB PPDU. 0 indicates the BCC, and 1 indicates the LDPC. Optionally, for an RU whose size is greater than 242 tones, there is no coding type indication, and a default coding type is the LDPC In another possible implementation, the number of bits occupied by the PPDU parameter subfield is 3. The PPDU parameter subfield indicates a type of a PPDU and a coding type. The type of the PPDU may occupy 2 bits, and the coding type may occupy 1 bit.

For example, 0 indicates the EHT MU PPDU, 1 indicates the EHT TB PPDU, and the rest bits are reserved bits. 0 indicates the BCC, and 1 indicates the LDPC. Particularly, for an RU whose size is greater than 242 tones, there may be no coding type indication, and a default coding type is the LDPC.

The PPDU parameter subfield and the MSI subfield may be a same subfield in the control subfield.

The resource unit indicated by the resource unit allocation indication subfield may include one or more of the following resource units: a 52+26-tone MRU, a 106+26-tone MRU, a 484+242-tone MRU, a 996+484-tone MRU, a 2×996+484-tone MRU, a 3×996-tone MRU, a 3×996+484-tone MRU, and a 4×996-tone RU.

Optionally, a number of bits occupied by the resource unit allocation indication subfield may be 7, 8, or 9. The resource unit allocation indication subfield may indicate the applicable resource unit by using a table index or a bitmap.

The resource unit allocation indication subfield indicates an RU for the EHT-MCS recommended by the first communication device or an RU indicated when the second communication device requests feedback.

Optionally, if an unsolicited MCS feedback subfield is set to 1 and a UL EHT TB PPDU MFB subfield is set to 0, the resource unit allocation subfield indicates the RU for the EHT-MCS recommended when a PPDU is sent to the first communication device.

Optionally, if an unsolicited MCS feedback subfield is set to 0 and an MCS request subfield is set to 1, the resource unit allocation subfield indicates an RU indicated when the second communication device requests feedback.

The resource unit allocation subfield and the bandwidth indication subfield together indicate a specific resource unit.

Optionally, if an unsolicited MCS feedback subfield is set to 1 and a UL EHT TB PPDU MFB subfield is set to 1, the resource unit allocation subfield indicates the resource unit applicable to the EHT-MCS recommended when the first communication device sends an EHT TB PPDU. An actually allocated resource unit may be ignored by the receiver.

Otherwise, this subfield is reserved.

For example, Table 2 shows an example of a resource unit allocation indication obtained when the number of bits occupied by the resource unit allocation indication subfield is 7.

TABLE 2

| Resource unit allocation indication (7 bits) | Indicated RU/MRU | Number of entries |
|---|---|---|
| 0000000-0001111 | 242-tone RU | 16 |
| 0010000-0010111 | 484-tone RU | 8 |
| 0011000-0100111 | 484 + 242-tone MRU | 16 |
| 0101000-0101011 | 996-tone RU | 4 |
| 0101100-0110011 | 996 + 484-tone MRU | 8 |
| 0110100-0110101 | 2 × 996-tone RU | 2 |
| 0110110-1000001 | 2 × 996 + 484-tone MRU | 12 |
| 1000010-1000101 | 3 × 996-tone MRU | 4 |
| 1000110-1001101 | 3 × 996 + 484-tone MRU | 8 |
| 1001110 | 4 × 996-tone RU | 1 |
| 1001111-1111111 | Reserved | 49 |

For example, Table 3 shows an example of a resource unit allocation indication obtained when the number of bits occupied by the resource unit allocation indication subfield is 8.

TABLE 3

| Bandwidth | Indicated RU/MRU | 8-bit bitmap indication |
|---|---|---|
| 20 MHz | 242 | 10000000 |
| 40 MHz | 242 | 10000000, 01000000 |
| | 484 | 11000000 |
| 80 MHz | 242 | 10000000, 01000000, 00100000, 00010000 |
| | 484 | 11000000, 00110000 |
| | 484 + 242 | 11100000, 11010000, 10110000, 01110000 |
| | 996 | 11110000 |

TABLE 3-continued

| Bandwidth | Indicated RU/MRU | 8-bit bitmap indication |
|---|---|---|
| 160 MHz | 242 | 10000000, 01000000, 00100000, 00010000, 00001000, 00000100, 00000010, 00000001 |
| | 484 | 11000000, 00110000, 00001100, 00000011 |
| | 484 + 242 | 11100000, 11010000, 10110000, 01110000, 00001110, 00001101, 00001011, 00000111 |
| | 996 | 11110000, 00001111 |
| | 996 + 484 | 11111100, 11110011, 11001111, 00111111 |
| | 996 + 484 + 242 | 11101111, 11011111, 10111111, 01111111, 11111110, 11111101, 11111011, 11110111 |
| | 2 × 996 | 11111111 |
| 320 MHz | 484 | 10000000, 01000000, 00100000, 00010000, 00001000, 00000100, 00000010, 00000001 |
| | 996 | 11000000, 00110000, 00001100, 00000011 |
| | 996 + 484 | 11100000, 11010000, 10110000, 01110000, 00001110, 00001101, 00001011, 00000111 |
| | 2 × 996 | 11110000, 00001111, |
| | 2 × 996 + 484 | 11111000, 11110100, 11101100, 11011100, 10111100, 01111100, 00111110, 00111101, 00111011, 00110111, 0010111, 0001111 |
| | 3 × 996 | 11111100, 11110011, 11001111, 00111111 |
| | 3 × 996 + 484 | 11111110, 11111101, 11111011, 11110111, 11101111, 11011111, 10111111, 01111111 |
| | 4 × 996 | 111111111 |

When the bandwidth is 20 MHz, 40 MHz, 80 MHz, or 160 MHz, each bit indicates one 242-tone RU. When the bandwidth is 320 MHz, each bit indicates one 484-tone RU.

For example, Table 4 shows an example of a resource unit allocation indication obtained when the number of bits occupied by the resource unit allocation indication subfield is 9.

TABLE 4

| Bandwidth | Indicated RU/MRU | 9-bit bitmap indication |
|---|---|---|
| 20 MHz | 242 | 010000000 |
| 40 MHz | 242 | 010000000, 001000000 |
| | 484 | 011000000 |
| 80 MHz | 242 | 010000000, 001000000, 000100000, 000010000 |
| | 484 | 011000000, 000110000 |
| | 484 + 242 | 011100000, 011010000, 010110000, 001110000 |
| | 996 | 011110000 |
| 160 MHz | 242 | 010000000, 001000000, 000100000, 000010000, 000001000, 000000100, 000000010, 000000001 |
| | 484 | 011000000, 000110000, 000001100, 000000011 |
| | 484 + 242 | 011100000, 011010000, 010110000, 001110000, 000001110, 000001101, 000001011, 000000111 |
| | 996 | 011110000, 000001111 |
| | 996 + 484 | 011111100, 011110011, 011001111, 000111111 |
| | 996 + 484 + 242 | 011101111, 011011111, 010111111, 001111111, 011111110, 011111101, 011111011, 011110111 |
| | 2 × 996 | 011111111 |
| 320 MHz | 484 | 110000000, 101000000, 100100000, 100010000, 100001000, 100000100, 100000010, 100000001 |
| | 996 | 111000000, 100110000, 100001100, 100000011 |
| | 996 + 484 | 111100000, 111010000, 110110000, 101110000, 100001110, 100001101, 100001011, 100000111 |
| | 2 × 996 | 111110000, 100001111, |
| | 2 × 996 + 484 | 111111000, 111110100, 111101100, 111011100, 110111100, 101111100, 100111110, 100111101, 100111011, 100110111, 10010111, 10001111 |
| | 3 × 996 | 111111100, 111110011, 111001111, 100111111 |
| | 3 × 996 + 484 | 111111110, 111111101, 111111011, 111110111, 111101111, 111011111, 110111111, 101111111 |
| | 4 × 996 | 111111111 |

A first bit indicates a granularity, and indicates whether each of following 8 bits indicates a 242-tone RU or a 484-tone RU. For example, 0 indicates a 242-tone RU and an applicable bandwidth of 20 MHz, 40 MHz, 80 MHz, or 160 MHz; and 1 indicates a 484-tone RU and an applicable bandwidth of 320 MHz. One or more bits are set to 1, to indicate different RU sizes.

Optionally, the control subfield in the first message may further include a UL EHT TB PPDU MFB subfield, and a number of bits occupied by the subfield is 1.

For example, if the unsolicited MCS feedback subfield is set to 1 and the UL EHT TB PPDU MFB subfield is set to 1, it indicates that the indicated number of spatial streams, the indicated EHT-MCS, the indicated bandwidth, and the indicated resource unit allocation subfield are MCS feedback parameters recommended when the first communication device sends the EHT TB PPDU. Otherwise, this subfield is reserved.

Optionally, the control subfield in the first message may further include a transmitter beamforming subfield, and the transmitter beamforming subfield indicates whether beamforming is performed on a PPDU used when the unsolicited MFB is estimated. A number of bits occupied by the subfield is 1.

For example, if the unsolicited MCS feedback subfield is set to 1 and the UL EHT TB PPDU MFB subfield is set to 0, the transmitter beamforming subfield is set to 0 to indicate a non-beamformed PPDU, or is set to 1 to indicate a beamformed PPDU. Otherwise, this subfield is reserved.

Optionally, the control subfield in the first message may further include a reserved subfield. A number of bits occupied by the reserved subfield is 1, to subsequently introduce more MCS types. Alternatively, the reserved subfield and the EHT-MCS subfield may be directly combined into 5 bits, where values 16 to 31 are reserved.

It should be noted that a number of bits occupied by a subfield in the control subfield may be adjusted based on an actual situation, provided that a number of bits occupied by all control subfields in the first message and the second message does not exceed 26.

In the technical solution provided in this application, the data receiver sends the first message to the data transmitter. The first message includes the control field. The control field includes the control subfield. The control subfield includes one or more of the following fields: the EHT indication subfield, the number of spatial streams subfield, the EHT-MCS subfield, and the MSI subfield. One or more of the number of spatial streams subfield, the EHT-MCS subfield, and the MSI subfield meet the following conditions: The number of bits occupied by the MSI subfield is less than or equal to 2, the maximum number of spatial streams that can be indicated by the number of spatial streams subfield is greater than 8, and the MCS indicated by the EHT-MCS subfield includes one or more of the following: the 4096-QAM, the BPSK-DCM, and/or the BPSK-DCM-DUP. A number of bits occupied by all subfields in the control subfield in the first message does not exceed 26. This implements transmission of link adaptation control information in the 802.11be standard and standards after the 802.11be standard.

Figure 6:
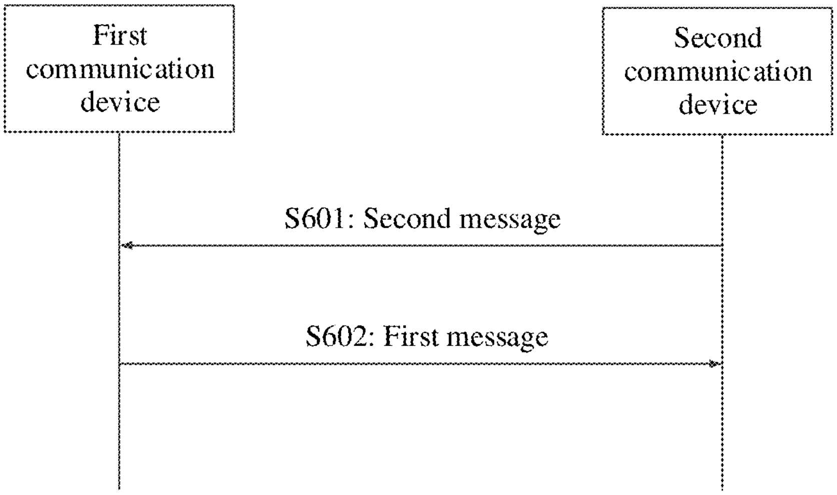
FIG. 6 is a schematic flowchart of a solicited EHT LA control information transmission method according to an embodiment of this application.

FIG. 6 is a schematic flowchart of a solicited EHT LA control information transmission method according to an embodiment of this application. As shown in FIG. 6, the method includes at least S601 and S602.

S601: A first communication device receives a second message sent by a second communication device.

The first communication device is a receiver, the second communication device is a transmitter, and the second message is a message for requesting EHT LA control information. The second communication device sends the second message to the first communication device, to request the EHT LA control information from the first communication device.

The second message includes a control field, and the control field includes a control subfield. In this case, an unsolicited MCS feedback subfield in the control subfield is set to 0, and an MCS request subfield is set to 1.

The control subfield in the second message meets at least one of the following conditions: An HE/EHT LA control differentiation indication subfield indicates that the control subfield is EHT LA; a bandwidth indication subfield may indicate a maximum of 320 MHz; a resource unit allocation indication subfield supports at least one of a 52+26-tone MRU, a 106+26-tone MRU, a 484+242-tone MRU, a 996+484-tone MRU, a 2×996+484-tone MRU, a 3×996-tone MRU, a 3×996+484-tone MRU, and a 4×996-tone RU; and a number of bits occupied by an MSI subfield is less than or equal to 2.

There are two possible implementations in which the HE/EHT LA control differentiation indication subfield indicates that the control subfield is the EHT LA.

In a possible implementation, when a control identifier in the control subfield is 2, the HE/EHT LA control differentiation indication subfield is set to 1 to indicate that the control subfield is the EHT LA.

In another possible implementation, when a control identifier in the control subfield may be any integer in 2 or 7 to 14, the control subfield does not include the HE/EHT LA control differentiation indication subfield. When a control identifier in the control subfield is set to any integer from 7 to 14, it indicates that the control subfield is the EHT LA.

The bandwidth indication subfield may be set to any integer from 0 to 4, and all integers from 0 to 4 respectively correspond to a bandwidth of 20 MHz, a bandwidth of 40 MHz, a bandwidth of 80 MHz, a bandwidth of 160 MHz, and a bandwidth of 320 MHz in sequence.

The MSI subfield may be set to any integer from 0 to 3, and each integer indicates a specific EHT-MCS feedback request. The number of bits occupied by the MSI subfield is less than or equal to 2.

S602: The first communication device sends a first message to the second communication device.

After receiving the second message sent by the second communication device, the first communication device identifies that the received control subfield is the EHT LA, and then sends the first message to the second communication device based on a PPDU measurement-related MFB parameter that is requested by MFB and that is carried in the control subfield in the second message, where the first message is an EHT LA feedback message.

The first message includes a control field, and the control field includes a control subfield. In this case, an unsolicited MCS feedback subfield is set to 0, and an MCS request subfield is set to 0.

The control subfield in the first message meets at least one of the following conditions: An HE/EHT LA control differentiation indication subfield indicates that the control subfield is the EHT LA; a number of spatial streams subfield may indicate more than eight streams; an EHT-MCS subfield includes 4096-QAM, BPSK-DCM, and BPSK-DCM-DUP; and a number of bits occupied by an MSI subfield is less than or equal to 2.

For the HE/EHT LA control differentiation indication subfield and the MSI subfield, refer to S601. Details are not described herein again.

The number of spatial streams subfield may indicate any one of numbers of spatial streams 1 to 16, or any one of numbers of spatial streams 1, 2, 4, 6, 8, 12, and 16 and another reserved number of spatial streams.

Optionally, a number of bits occupied by the number of spatial streams subfield is 3 or 4.

In a possible implementation, when the number of spatial streams indicated by the number of spatial streams subfield is any one of 1, 2, 4, 6, 8, 12, 16, and another reserved number of spatial streams, the number of bits occupied by the number of spatial streams subfield is 3.

In another possible implementation, when the number of spatial streams indicated by the number of spatial streams subfield is any one of 1 to 16, the number of bits occupied by the number of spatial streams subfield is 4.

The EHT-MCS subfield includes any integer from 0 to 15, where 0 indicates BPSK and a bit rate (R) 1/2; 1 indicates QSPK and R 1/2; 2 indicates QPSK and R 3/4; 3 indicates 16-QAM and R 1/2; 4 indicates 16-QAM and R 3/4; 5 indicates 64-QAM and R 2/3; 6 indicates 64-QAM and R 3/4; 7 indicates 64-QAM and R 5/6; 8 indicates 256-QAM and R 3/4; 9 indicates 256-QAM and R 5/6; 10 indicates 1024-QAM and R 3/4; 11 indicates 1024-QAM and R 5/6; 12 indicates 4096-QAM and R 3/4; 13 indicates 4096-QAM and R 5/6; 14 indicates BPSK-DCM-DUP and R 1/2; and 15 indicates BPSK-DCM and R 1/2.

15 indicates BPSK with DCM. When the EHT-MCS subfield indicates 0 or 15, a function of the DCM in HLA is implemented. 14 indicates that DUP transmission is introduced based on the BPSK-DCM.

Optionally, a number of bits occupied by the EHT-MCS subfield is 4 or 5.

It should be noted that a number of bits occupied by a subfield in the control subfield may be adjusted based on an actual situation, provided that a number of bits occupied by all control subfields in the first message and the second message does not exceed 26.

In the technical solution provided in this application, before the first communication device sends the first message to the second communication device, the first communication device receives the second message sent by the second communication device, and the first communication device sends the first message to the second communication device based on the second message. The control subfield in the second message includes one or more of the following fields: an EHT indication subfield, the bandwidth indication subfield, and the resource unit allocation indication subfield. A bandwidth indicated by the bandwidth indication subfield is 320 megahertz, and/or a resource unit indicated by the resource unit allocation indication subfield includes one or more of the following resource units: the 52+26-tone MRU, the 106+26-tone MRU, the 484+242-tone MRU, the 996+484-tone MRU, the 2×996+484-tone MRU, the 3×996-tone MRU, the 3×996+484-tone MRU, and the 4×996-tone RU. The number of bits occupied by all subfields in the control subfields in the first message and the second message does not exceed 26. This implements solicited transmission of link adaptation control information in the 802.11be standard and standards after the 802.11be standard.

Figure 7:
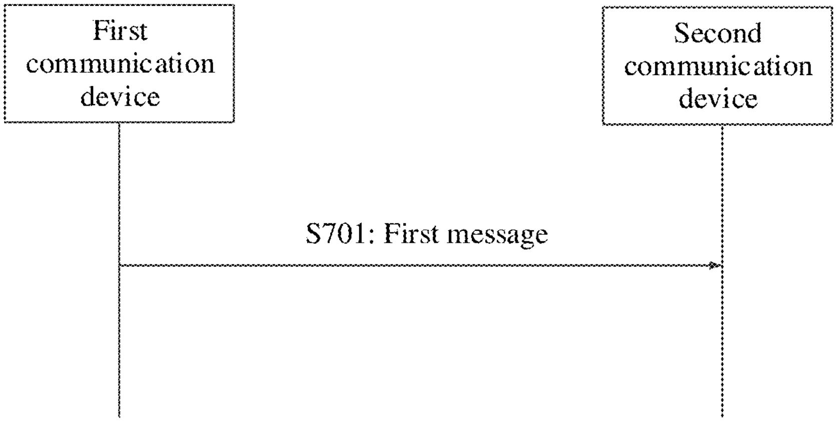
FIG. 7 is a schematic flowchart of an unsolicited EHT LA control information transmission method according to an embodiment of this application.

FIG. 7 is a schematic flowchart of an unsolicited EHT LA control information transmission method according to an embodiment of this application. As shown in FIG. 7, the method includes at least S701.

S701: A first communication device sends a first message to a second communication device.

The first communication device is a data receiver, and the second communication device is a data transmitter. The first communication device sends the first message to the second communication device. The first message includes a control field, the control field includes a control subfield, and an MFB parameter carried in the control subfield is estimated based on a latest received PPDU. In this case, an unsolicited MCS feedback subfield in the control subfield is set to 1.

The control subfield in the first message meets at least one of the following conditions: An HE/EHT LA control differentiation indication subfield indicates that the control subfield is EHT LA; a bandwidth indication subfield may indicate a maximum of 320 MHz; a resource unit allocation indication subfield supports at least one of a 52+26-tone MRU, a 106+26-tone MRU, a 484+242-tone MRU, a 996+484-tone MRU, a 2×996+484-tone MRU, a 3×996-tone MRU, a 3×996+484-tone MRU, and a 4×996-tone RU; a number of spatial streams subfield may indicate more than eight streams; an EHT-MCS subfield includes 4096-QAM, BPSK-DCM, and BPSK-DCM-DUP; a number of bits occupied by an MSI subfield is less than or equal to 2; and a PPDU of the PPDU parameter subfield includes at least one of an EHT MU PPDU and an EHT TB PPDU.

For the HE/EHT LA control differentiation indication subfield, the bandwidth indication subfield, the resource unit allocation indication subfield, the number of spatial streams subfield, the EHT-MCS subfield, and the PPDU parameter subfield in the first message, refer to S501, S601, and S602. Details are not described herein again.

It should be noted that a number of bits occupied by a subfield in the control subfield may be adjusted based on an actual situation, provided that a number of bits occupied by all control subfields in the first message and a second message does not exceed 26.

In the technical solution provided in this application, the first communication device performs estimation based on the latest received PPDU parameter, and sends the first message to the second communication device. In this case, the unsolicited MCS feedback subfield in the control subfield in the first message is set to 1, and a number of bits occupied by all subfields in the control subfield in the first message does not exceed 26. This implements unsolicited transmission of link adaptation control information in the 802.11be standard and standards after the 802.11be standard.

The following briefly describes the subfields in the control subfield with reference to Table 5.

TABLE 5

| Subfield | Meaning | Definition |
|---|---|---|
| Unsolicited MCS feedback subfield 1 bit | Unsolicited MFB indicator | If this bit is set to 1, it indicates that the EHT LA control is the unsolicited MFB. If this bit is set to 0, it indicates that the EHT LA control is an MCS request or solicited MCS feedback. |
| MCS request subfield 1 bit | EHT LA feedback request indication | If the unsolicited MCS feedback subfield is set to 0 and the MCS request subfield is set to 1, it indicates requesting EHT LA feedback. If the unsolicited MCS feedback subfield is set to 0 and the MCS request subfield is set to 0, it indicates responding to EHT LA feedback. If the unsolicited MCS feedback subfield is set to 1, the MCS request subfield is reserved. |
| Number of spatial streams subfield 4 bits or 3 bits | Recommended number of spatial streams | If the unsolicited MCS feedback subfield is set to 1 and a UL EHT TB PPDU MFB subfield is set to 0, or the unsolicited MCS feedback subfield is set to 0 and the MCS request subfield is set to 0, the number of spatial streams subfield indicates a number of spatial streams recommended when a PPDU is sent to the data transmitter. If the unsolicited MCS feedback subfield and a UL EHT TB PPDU MFB subfield are set to 1, the number of spatial streams subfield indicates a number of spatial streams recommended when the data receiver sends an EHT TB PPDU. When the number of spatial streams indicated by the number of spatial streams subfield is |

TABLE 5-continued

| Subfield | Meaning | Definition |
|---|---|---|
| | | any one of 1, 2, 4, 6, 8, 12, 16, and another reserved number of spatial streams, a number of bits occupied by the number of spatial streams subfield is 3. When the number of spatial streams indicated by the number of spatial streams subfield is any one of 1 to 16, a number of bits occupied by the number of spatial streams subfield is 4. Otherwise, this subfield is reserved. |
| EHT-MCS subfield 4 bits or 5 bits | Recommended EHT-MCS | If the unsolicited MCS feedback subfield is set to 1 and the UL EHT TB PPDU MFB subfield is set to 0, or the unsolicited MCS feedback subfield is set to 0 and the MCS request subfield is set to 0, the EHT-MCS subfield indicates an EHT-MCS recommended when the PPDU is sent to the data transmitter. If the unsolicited MCS feedback subfield is set to 1 and the UL EHT TB PPDU MFB subfield is set to 1, the EHT-MCS subfield indicates an EHT-MCS recommended when the data receiver sends the EHT TB PPDU. Otherwise, this subfield is reserved. When this field occupies 4 bits, the EHT-MCS subfield indicates 0 to 15 (0 to 11 indicate the same meaning as those in the HE standard, and 12 to 15 are newly defined in the EHT standard).<br>0 indicates BPSK and R (bit rate) 1/2.<br>1 indicates QSPK and R 1/2.<br>2 indicates QPSK and R 3/4.<br>3 indicates 16-QAM and R 1/2.<br>4 indicates 16-QAM and R 3/4.<br>5 indicates 64-QAM and R 2/3.<br>6 indicates 64-QAM and R 3/4.<br>7 indicates 64-QAM and R 5/6.<br>8 indicates 256-QAM and R 3/4.<br>9 indicates 256-QAM and R 5/6.<br>10 indicates 1024-QAM and R 3/4.<br>11 indicates 1024-QAM and R 5/6.<br>12 indicates 4096-QAM and R 3/4.<br>13 indicates 4096-QAM and R 5/6.<br>14 indicates BPSK-DCM-DUP and R 1/2.<br>15 indicates BPSK-DCM and R 1/2.<br>15 indicates BPSK with DCM. When the EHT-MCS subfield indicates 0 or 15, a same or similar function as the DCM in the HLA may be implemented. 14 indicates that DUP transmission is introduced based on the BPSK-DCM. |
| Reserved subfield 1 bit or none | Reserved | Reserved bits are used to subsequently introduce more MCS types. Alternatively, the reserved subfield and the EHT-MCS subfield may be directly combined into 5 bits, where indicated values 16 to 31 are reserved. |
| Resource unit allocation indication subfield 7 bits, 8 bits, or 9 bits | RU applicable to the recommended EHT-MCS or RU indicated when an MFB requester requests feedback | If the unsolicited MCS feedback subfield is set to 1 and the UL EHT TB PPDU MFB subfield is set to 0, the resource unit allocation subfield indicates an RU for an EHT-MCS recommended when a PPDU is sent to the data receiver. If the unsolicited MCS feedback subfield is set to 0 and the MCS request subfield is set to 1, the resource unit allocation subfield indicates an RU indicated when the data transmitter requests feedback. The resource unit allocation subfield and the bandwidth indication subfield together indicate a specific resource unit. If the unsolicited MCS feedback subfield is set to 1 and the UL EHT TB PPDU MFB subfield is set to 1, the resource unit allocation subfield indicates a resource unit applicable to the EHT-MCS recommended when the data receiver sends the EHT TB PPDU, and an actually allocated resource |

TABLE 5-continued

| Subfield | Meaning | Definition |
|---|---|---|
| | | unit may be ignored by the receiver. Otherwise, this subfield is reserved. A number of bits occupied by the resource unit allocation indication subfield may be 7, 8, or 9. The resource unit allocation indication subfield may indicate the applicable resource unit by using a table index or a bitmap. |
| Bandwidth indication subfield 3 bits | Bandwidth applicable to the recommended EHT-MCS or bandwidth indicated when the MFB requester requests the feedback | If the unsolicited MCS feedback subfield is set to 1 and the UL EHT TB PPDU MFB subfield is set to 0, the bandwidth indication subfield indicates a bandwidth applicable to the EHT-MCS recommended when the PPDU is sent to the data receiver. If the unsolicited MCS feedback subfield is set to 0 and the MCS request subfield is set to 1, the bandwidth indication field indicates a bandwidth indicated when the data transmitter requests the feedback. If the unsolicited MCS feedback subfield is set to 1 and the UL EHT TB PPDU MFB subfield is set to 1, the bandwidth indication subfield indicates a bandwidth applicable to the EHT-MCS recommended when the data receiver sends the EHT TB PPDU. A number of bits occupied by the bandwidth indication subfield may be 3, and the bandwidth indication subfield may include any integer from 0 to 4. When this subfield is set to 0, it indicates 20 MHz. When this subfield is set to 1, it indicates 40 MHz. When this subfield is set to 2, it indicates 80 MHz. When this subfield is set to 3, it indicates 160 MHz. When this subfield is set to 4, it indicates 320 MHz. Otherwise, this subfield is reserved. |
| MSI subfield or PPDU parameter subfield 2 bits or 3 bits | MCS request sequence identifier or partial parameters of a measured PPDU | If the unsolicited MCS feedback subfield is set to 0 and the MCS request subfield is set to 1, the MSI subfield or the PPDU parameter subfield includes a sequence number from 0 to 3 to indicate a specific EHT-MCS feedback request. If the unsolicited MCS feedback subfield is set to 0 and the MCS request subfield is set to 0, the MSI subfield or the PPDU parameter subfield includes a sequence number from 0 to 3 to indicate specific EHT-MCS feedback. If the unsolicited MCS feedback subfield is set to 1, the MSI subfield or the PPDU parameter subfield indicates a type of a PPDU for parameter estimation of the unsolicited MFB. A type of a 1-bit PPDU may be as follows: 0 indicates an EHT MU PPDU; and 1 indicates an EHT TB PPDU If the PPDU type occupies 2 bits, 2 and 3 are reserved. A 1-bit coding type is as follows: 0 indicates BCC. 1 indicates LDPC. For an RU whose size is greater than 242 tones, there is no coding type indication, and a default coding type is the LDPC. |
| Transmitter beamforming subfield 1 bit | Transmission type of the measured PPDU | If the unsolicited MCS feedback subfield is set to 1 and the UL EHT TB PPDU MFB subfield is set to 0, the transmitter beamforming subfield is set to 0 to indicate a non-beamformed PPDU, or is set to 1 to indicate a beamformed PPDU. Otherwise, this subfield is reserved. |

TABLE 5-continued

| Subfield | Meaning | Definition |
|---|---|---|
| UL EHT TB PPDU MFB subfield 1 bit | Uplink extremely high throughput trigger-based PPDU MCS feedback indication | If the unsolicited MCS feedback subfield is set to 1 and the UL EHT TB PPDU MFB subfield is set to 1, it indicates that the indicated number of spatial streams, the indicated EHT-MCS, and the indicated bandwidth, and the indicated resource unit allocation subfield are MCS feedback parameters recommended when the data receiver sends the EHT TB PPDU. Otherwise, this subfield is reserved. |
| HE/EHT differentiation indication 1 bit | HE/EHT differentiation indication | If the HE/EHT indication subfield is set to 0, it indicates that the control subfield is an HLA control subfield. If the HE/EHT indication subfield is set to 1, it indicates that the control subfield is an EHT LA control subfield. |

Figure 8:
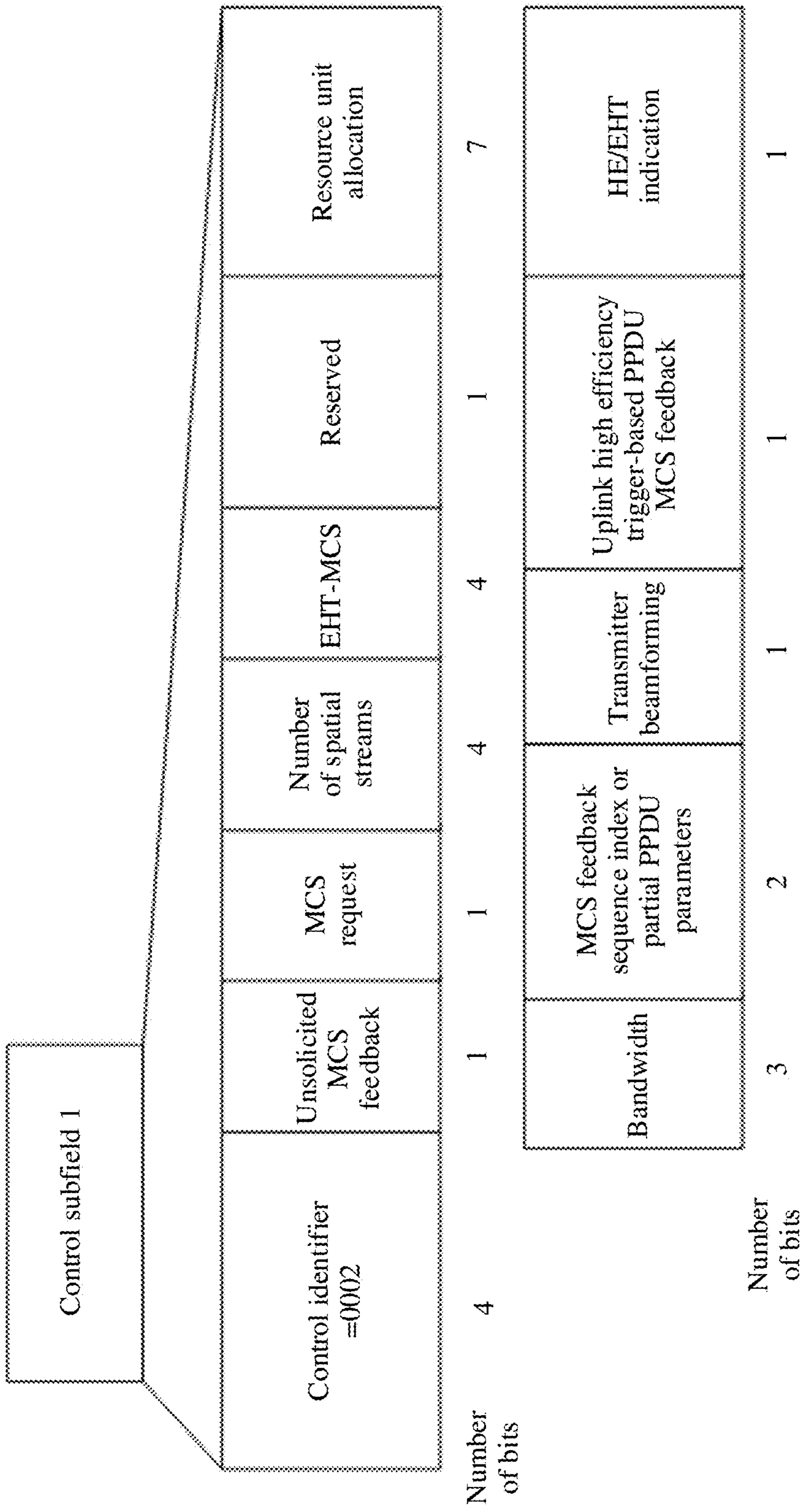
FIG. 8 is a schematic diagram of a new control subfield according to an embodiment of this application.

FIG. 8 is a schematic diagram of a new control subfield according to an embodiment of this application. As shown in FIG. 8, the control subfield includes a control identifier, an unsolicited MCS feedback subfield, an MCS request subfield, a number of spatial streams subfield, an EHT-MCS subfield, a resource unit allocation indication subfield, a bandwidth indication subfield, an MSI subfield or a PPDU parameter subfield, a transmitter beamforming subfield, a UL EHT TB PPDU MFB subfield, an HE/EHT indication subfield, and a reserved subfield. A value of the control identifier is 2.

The unsolicited MCS feedback subfield indicates whether control information carried in the control subfield is unsolicited MCS feedback information. If the unsolicited MCS feedback subfield is set to 1, it indicates that EHT LA control is unsolicited MFB. If the unsolicited MCS feedback subfield is set to 0, it indicates that EHT LA control is an MCS request or solicited MCS feedback.

The MCS request subfield indicates requesting EHT LA feedback. If the unsolicited MCS feedback subfield is set to 0 and the MCS request subfield is set to 1, it indicates requesting the EHT LA feedback. If the unsolicited MCS feedback subfield is set to 0 and the MCS request subfield is set to 0, it indicates responding to the EHT LA feedback. If the unsolicited MCS feedback subfield is set to 1, the MCS request subfield is reserved.

The number of spatial streams subfield indicates a number of spatial streams recommended by the first communication device.

Optionally, if the unsolicited MCS feedback subfield is set to 1 and the UL EHT TB PPDU MFB subfield is set to 0, or the unsolicited MCS feedback subfield is set to 0 and the MCS request subfield is set to 0, the number of spatial streams subfield indicates a number of spatial streams recommended when a PPDU is sent to the second communication device.

Optionally, if the unsolicited MCS feedback subfield is set to 1 and the UL EHT TB PPDU MFB subfield is set to 1, the number of spatial streams subfield indicates a number of spatial streams recommended when the first communication device sends an EHT TB PPDU.

The number of spatial streams subfield may indicate any one of numbers of spatial streams 1 to 16, or any one of numbers of spatial streams 1, 2, 4, 6, 8, 12, and 16 and another reserved number of spatial streams.

Optionally, a number of bits occupied by the number of spatial streams subfield is 3 or 4.

In a possible implementation, when the number of spatial streams indicated by the number of spatial streams subfield is any one of 1, 2, 4, 6, 8, 12, 16, and another reserved number of spatial streams, the number of bits occupied by the number of spatial streams subfield is 3.

In another possible implementation, when the number of spatial streams indicated by the number of spatial streams subfield is any one of 1 to 16, the number of bits occupied by the number of spatial streams subfield is 4.

The EHT-MCS subfield indicates an EHT-MCS recommended by the first communication device.

Optionally, if the unsolicited MCS feedback subfield is set to 1 and the UL EHT TB PPDU MFB subfield is set to 0, or the unsolicited MCS feedback subfield is set to 0 and the MCS request subfield is set to 0, the EHT-MCS subfield indicates an EHT-MCS recommended when the PPDU is sent to the second communication device.

Optionally, if the unsolicited MCS feedback subfield is set to 1 and the UL EHT TB PPDU MFB subfield is set to 1, the EHT-MCS subfield indicates an EHT-MCS recommended when the first communication device sends the EHT TB PPDU.

For example, the EHT-MCS subfield may include any integer from 0 to 15, where 0 indicates BPSK and a bit rate (R) 1/2; 1 indicates QSPK and R 1/2; 2 indicates QPSK and R 3/4; 3 indicates 16-QAM and R 1/2; 4 indicates 16-QAM and R 3/4; 5 indicates 64-QAM and R 2/3; 6 indicates 64-QAM and R 3/4; 7 indicates 64-QAM and R 5/6; 8 indicates 256-QAM and R 3/4; 9 indicates 256-QAM and R 5/6; 10 indicates 1024-QAM and R 3/4; 11 indicates 1024-QAM and R 5/6; 12 indicates 4096-QAM and R 3/4; 13 indicates 4096-QAM and R 5/6; 14 indicates BPSK-DCM-DUP and R 1/2; and 15 indicates BPSK-DCM and R 1/2.

15 indicates BPSK with DCM. When the EHT-MCS subfield indicates 0 or 15, a same or similar function as the DCM in HLA may be implemented. 14 indicates that DUP transmission is introduced based on BPSK-DCM.

Optionally, a number of bits occupied by the EHT-MCS subfield may be 4 or 5.

The resource unit allocation indication subfield indicates an RU for the EHT-MCS recommended by the first communication device or an RU indicated when the second communication device requests feedback.

Optionally, if the unsolicited MCS feedback subfield is set to 1 and the UL EHT TB PPDU MFB subfield is set to 0, the resource unit allocation subfield indicates an RU for the EHT-MCS recommended when a PPDU is sent to the first communication device.

Optionally, if the unsolicited MCS feedback subfield is set to 0 and the MCS request subfield is set to 1, the resource unit allocation subfield indicates the RU indicated when the second communication device requests the feedback.

The resource unit allocation subfield and the bandwidth indication subfield together indicate a specific resource unit.

Optionally, if the unsolicited MCS feedback subfield is set to 1 and the UL EHT TB PPDU MFB subfield is set to 1, the resource unit allocation subfield indicates a resource unit applicable to the EHT-MCS recommended when the first communication device sends the EHT TB PPDU. An actually allocated resource unit may be ignored by the receiver.

Otherwise, this subfield is reserved.

Optionally, a number of bits occupied by the resource unit allocation indication subfield may be 7, 8, or 9. The resource unit allocation indication subfield may indicate the applicable resource unit by using a table index or a bitmap. For the applicable resource unit indicated by the resource unit allocation indication subfield by using the table index or the bitmap, refer to S501. Details are not described herein again.

The bandwidth indication subfield indicates a bandwidth applicable to the EHT-MCS recommended by the first communication device or a bandwidth indicated when the second communication device requests the feedback.

Optionally, if the unsolicited MCS feedback subfield is set to 1 and the UL EHT TB PPDU MFB subfield is set to 0, the bandwidth indication subfield indicates a bandwidth applicable to the EHT-MCS recommended when the PPDU is sent to the first communication device.

Optionally, if the unsolicited MCS feedback subfield is set to 0 and the MCS request subfield is set to 1, the bandwidth indication field indicates the bandwidth indicated when the second communication device requests the feedback.

Optionally, if the unsolicited MCS feedback subfield is set to 1 and the UL EHT TB PPDU MFB subfield is set to 1, the bandwidth indication subfield indicates a bandwidth applicable to the EHT-MCS recommended when the first communication device sends the EHT TB PPDU.

A number of bits occupied by the bandwidth indication subfield may be 3. The bandwidth indication subfield may include any integer from 0 to 4. All integers from 0 to 4 may respectively correspond to 20 MHz, 40 MHz, 80 MHz, 160 MHz, and 320 MHz in sequence. The rest bits may be reserved bits.

The MSI subfield or the PPDU parameter subfield indicates an MCS request indication sequence or a type of a PPDU.

Optionally, if the unsolicited MCS feedback subfield is set to 0 and the MCS request subfield is set to 1, the MSI subfield or the PPDU parameter subfield includes a sequence number from 0 to 3 to indicate a specific EHT-MCS feedback request. In this case, a number of bits occupied by the MSI subfield or the PPDU parameter subfield is 2.

Optionally, if the unsolicited MCS feedback subfield is set to 0 and the MCS request subfield is set to 0, the MSI subfield or the PPDU parameter subfield includes a sequence number from 0 to 3 to indicate specific EHT-MCS feedback. In this case, a number of bits occupied by the MSI subfield or the PPDU parameter subfield is 2.

Optionally, if the unsolicited MCS feedback subfield is set to 1, the MSI subfield or the PPDU parameter subfield indicates a type of a PPDU for parameter estimation of the unsolicited MFB. In this case, a number of bits occupied by the PPDU parameter subfield is 2 or 3.

In a possible implementation, the number of bits occupied by the PPDU parameter subfield is 2. The PPDU parameter subfield indicates a type of a PPDU and a coding type. The PPDU may include an EHT MU PPDU and an EHT TB PPDU, and the coding type may include BCC and LDPC. The type of the PPDU may occupy 1 bit, and the coding type may occupy 1 bit.

For example, 0 indicates the EHT MU PPDU, and 1 indicates the EHT TB PPDU. 0 indicates the BCC, and 1 indicates the LDPC. Optionally, for an RU whose size is greater than 242 tones, there is no coding type indication, and a default coding type is the LDPC.

In another possible implementation, the number of bits occupied by the PPDU parameter subfield is 3. The PPDU parameter subfield indicates a type of a PPDU and a coding type. The type of the PPDU may occupy 2 bits, and the coding type may occupy 1 bit.

For example, 0 indicates the EHT MU PPDU, 1 indicates the EHT TB PPDU, and the rest bits are reserved bits. 0 indicates the BCC, and 1 indicates the LDPC. Particularly, for an RU whose size is greater than 242 tones, there is no coding type indication, and a default coding type is the LDPC.

The transmitter beamforming subfield indicates whether beamforming is performed on a PPDU used when the unsolicited MFB is estimated. A number of bits occupied by the subfield is 1.

For example, if the unsolicited MCS feedback subfield is set to 1 and the UL EHT TB PPDU MFB subfield is set to 0, the transmitter beamforming subfield is set to 0 to indicate a non-beamformed PPDU, or is set to 1 to indicate a beamformed PPDU. Otherwise, this subfield is reserved.

The UL EHT TB PPDU MFB subfield indicates uplink extremely high throughput trigger-based PPDU MCS feedback.

Optionally, if the unsolicited MCS feedback subfield is set to 1 and the UL EHT TB PPDU MFB subfield is set to 1, it indicates that the indicated number of spatial streams, the indicated EHT-MCS, the indicated bandwidth, and the indicated resource unit allocation subfield are MCS feedback parameters recommended when the first communication device sends the EHT TB PPDU. Otherwise, this subfield is reserved.

The HE/EHT indication subfield is used to differentiate whether the control subfield is an HLA control subfield or an EHT LA control subfield. If the HE/EHT indication subfield is set to 0, it indicates that the control subfield is the HLA control subfield. If the HE/EHT indication subfield is set to 1, it indicates that the control subfield is the EHT LA control subfield. A number of bits occupied by the HE/EHT indication subfield is 1.

A number of bits occupied by the reserved subfield is 1. The reserved subfield is used to subsequently introduce more MCS types. Alternatively, the reserved subfield and the EHT-MCS subfield may be directly combined into 5 bits, where indicated values 16 to 31 are reserved.

In this embodiment of this application, the first communication device is the data receiver, and the second communication device is the data transmitter.

It may be understood that the subfields in the control subfield shown in FIG. 8 are merely examples. This is not limited in this application. In addition, a number of bits occupied by each subfield in the control subfield may be adjusted based on an actual situation, provided that a number of bits occupied by all subfields in the control subfield does not exceed a preset number of bits. For example, the number of bits occupied by all the subfields in the control subfield does not exceed 26.

Figure 9:
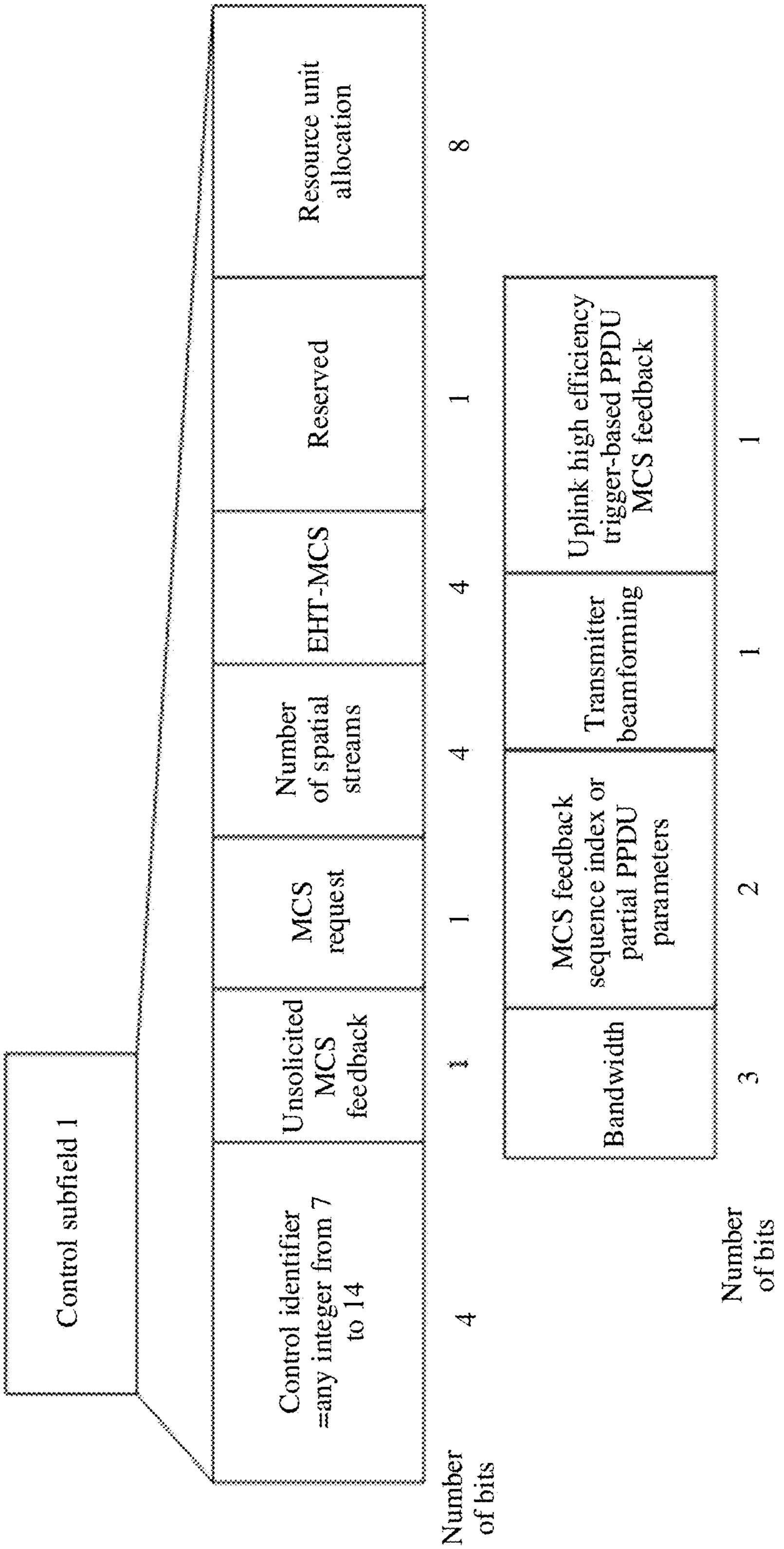
FIG. 9 is a schematic diagram of another new control subfield according to an embodiment of this application.

FIG. 9 is a schematic diagram of another new control subfield according to an embodiment of this application. As shown in FIG. 9, the control subfield includes a control identifier, an unsolicited MCS feedback subfield, an MCS request subfield, a number of spatial streams subfield, an EHT-MCS subfield, a resource unit allocation indication subfield, a bandwidth indication subfield, an MSI subfield or a PPDU parameter subfield, a transmitter beamforming subfield, a UL EHT TB PPDU MFB subfield, and a reserved subfield.

Compared with the control subfield shown in FIG. 8, in the control subfield shown in FIG. 9, the HE/EHT indication subfield is not used to differentiate whether the control subfield is the HLA control subfield or the EHT LA control subfield, but a new control identifier is used in the control subfield. For example, when a value of the control identifier is 2, it indicates that the control subfield is the HLA control subfield. When a value of the control identifier is any integer from 7 to 14, it indicates that the control subfield is the EHT LA control subfield.

For all subfields in the control subfield, refer to FIG. 8. Details are not described herein again.

It may be understood that the subfields in the control subfield shown in FIG. 9 are merely examples. This is not limited in this application. In addition, a number of bits occupied by each subfield in the control subfield may be adjusted based on an actual situation, provided that a number of bits occupied by all subfields in the control subfield does not exceed a preset number of bits. For example, the number of bits occupied by all the subfields in the control subfield does not exceed 26.

Figure 10:
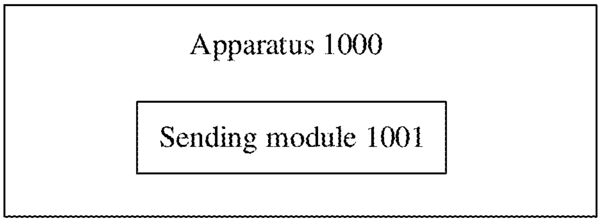
FIG. 10 is a schematic diagram of a structure of an EHT LA control information transmission apparatus according to an embodiment of this application.

FIG. 10 is a schematic diagram of a structure of an EHT LA control information transmission apparatus according to an embodiment of this application. As shown in FIG. 10, the apparatus 1000 may include a sending module 1001.

In a possible implementation, the apparatus 1000 may be configured to implement the method shown in FIG. 5. For example, the sending module 1001 is configured to implement S501.

In another possible implementation, the apparatus 1000 may further include a receiving module. The apparatus 1000 in this implementation may be configured to implement the method shown in FIG. 6. For example, the sending module 1001 is configured to implement S601, and the receiving module is configured to implement S602.

In still another possible implementation, the apparatus 1000 may be configured to implement the method shown in FIG. 7. For example, the sending module 1001 is configured to implement S701.

Figure 11:
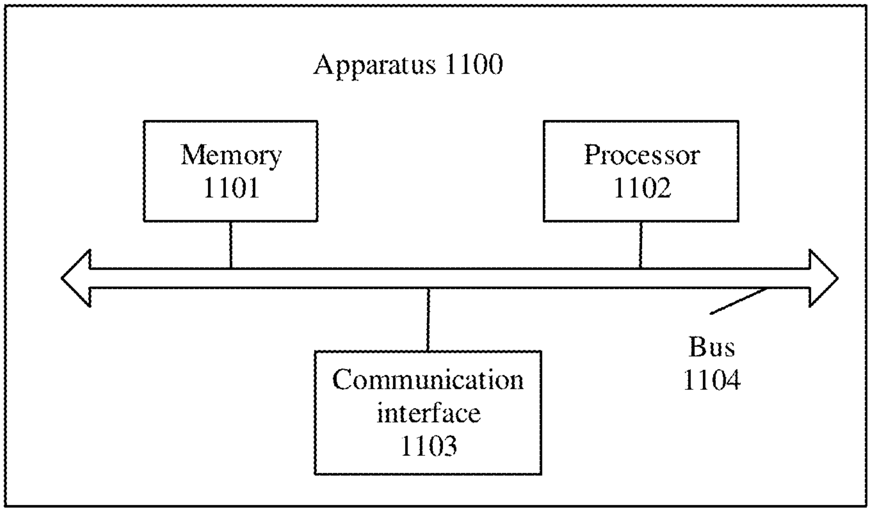
FIG. 11 is a schematic diagram of a structure of an EHT LA control information transmission apparatus according to another embodiment of this application.

FIG. 11 is a schematic diagram of a structure of an EHT LA control information transmission apparatus according to another embodiment of this application. The apparatus 1100 shown in FIG. 11 may be configured to perform the method implemented in this embodiment shown in any one of FIG. 5 to FIG. 7.

As shown in FIG. 11, the apparatus 1100 provided in this embodiment includes a memory 1101, a processor 1102, a communication interface 1103, and a bus 1104. A communication connection between the memory 1101, the processor 1102, and the communication interface 1103 is implemented through the bus 1104.

The memory 1101 may be a read-only memory (ROM), a static storage device, a dynamic storage device, or a random access memory (RAM). The memory 1101 may store a program. When the program stored in the memory 1101 is executed by the processor 1102, the processor 1102 may be configured to perform steps of the methods shown in FIG. 5 to FIG. 7.

The processor 1102 may be a general-purpose central processing unit (CPU), a microprocessor, an application-specific integrated circuit (ASIC), or one or more integrated circuits. The processor 1102 is configured to execute a related program, to implement transmission of EHT LA control information in the method embodiments of this application.

Alternatively, the processor 1102 may be an integrated circuit chip, and has a signal processing capability. In an implementation process, the steps of the methods in embodiments of this application may be completed by using a hardware integrated logic circuit in the processor 1102 or instructions in a form of software.

The processor 1102 may alternatively be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like.

The steps of the methods disclosed with reference to embodiments of this application may be directly performed and completed by a hardware decoding processor, or may be performed and completed by a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1101. The processor 1102 reads information in the memory 1101, and completes, in combination with hardware of the processor 1102, functions that are performed in the methods in embodiments of this application. For example, the processor 1102 may perform the steps/functions in the embodiments shown in FIG. 5 to FIG. 7.

The communication interface 1103 uses a transceiver apparatus, for example, but not limited to, a transceiver, to implement communication between the apparatus 1100 and another device or a communication network.

The bus 1104 may include a path for information transfer between various components (for example, the memory 1101, the processor 1102, and the communication interface 1103) of the apparatus 1100.

It should be understood that the apparatus 1100 shown in this embodiment of this application may be an electronic device, or may be a chip disposed in an electronic device.

It should be understood that, the processor in embodiments of this application may be a central processing unit (CPU), or may be another general-purpose processor, a digital signal processor (DSP), an application-specific integrated circuit (ASIC), a field-programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through an example rather than a limitative description, random access memories (RAMs) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (RAM).

All or some of the foregoing embodiments may be implemented by using software, hardware, firmware, or any combination thereof. When software is used to implement embodiments, the foregoing embodiments may be implemented all or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: only A exists, both A and B exist, and only B exists. A and B may be singular or plural. In addition, the character "/" in this specification generally indicates an "or" relationship between the associated objects, but may also indicate an "and/or" relationship. For details, refer to the foregoing and following descriptions for understanding.

In this application, "at least one" means one or more, and "a plurality of" means two or more. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, with reference to the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that this implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located at one location, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An extremely high throughput (EHT) link adaptation (LA) control information transmission method, comprising:

sending a first message, wherein the first message comprises a control field, the control field comprises a control subfield, the control subfield comprises:

a bandwidth indication subfield, a high efficiency (HE)/EHT indication subfield, a number-of-spatial-streams subfield, an EHT-modulation and coding scheme (MCS) subfield, and an MCS request sequence identifier (MSI) subfield, a quantity of bits occupied by the bandwidth indication subfield is 3, a quantity of bits occupied by the control subfield is not greater than 26, the HE/EHT indication subfield indicates that the control subfield is an HE link adaptation (HLA) control subfield or an EHT LA control subfield, the number-of-spatial-streams subfield indicates a recommended number of spatial streams, the EHT-MCS subfield indicates a recommended EHT-MCS, the bandwidth indication subfield is used to indicate a bandwidth to which the recommended EHT-MCS is applicable, the MSI subfield indicates an MCS request sequence, and an MCS indicated by the EHT-MCS subfield comprises one or more of:

binary phase shift keying (BPSK)-dual carrier modulation (DCM), or

BPSK-DCM-duplication (DUP).

2. The EHT LA control information transmission method according to claim 1, wherein the MCS indicated by the EHT-MCS subfield further comprises 4096-quadrature amplitude modulation (QAM).

3. The EHT LA control information transmission method according to claim 1, further comprising:

receiving a second message, wherein the second message comprises a control field, the control field in the second message comprises a control subfield, the control subfield in the second message comprises one or more of:

an EHT indication subfield, a bandwidth indication subfield, or a resource unit (RU) allocation indication subfield, the bandwidth indication subfield indicates a bandwidth applicable to the recommended EHT-MCS, the RU allocation indication subfield indicates a RU applicable to the recommended EHT-MCS, and one or more of the bandwidth indicated by the bandwidth indication subfield is 320 megahertz, or the RU indicated by the RU allocation indication subfield comprises one or more of:

an MRU comprising a 52-tone RU and a 26-tone RU, an MRU comprising a 106-tone RU and a 26-tone RU, an MRU comprising a 484-tone RU and a 242-tone RU, an MRU comprising a 996-tone RU and a 484-tone RU, an MRU comprising two 996-tone RUs and a 484-tone RU, an MRU comprising three 996-tone RUs, an MRU comprising three 996-tone RUs and a 484-tone RU, or an RU comprising four 996-tone RUs.

4. The EHT LA control information transmission method according to claim 3, wherein the control subfield in the first message and the control subfield in the second message each further comprise an unsolicited MCS feedback subfield, the unsolicited MCS feedback subfield indicates that a message carrying the unsolicited MCS feedback subfield is a solicited feedback message, the first message further comprises an MCS request subfield, the MCS request subfield indicates that the first message is for responding to EHT LA feedback, the second message further comprises an MCS request subfield, and the MCS request subfield in the second message indicates that the second message is for requesting the EHT LA feedback.

5. The EHT LA control information transmission method according to claim 1, wherein the control subfield further comprises one or more of:

a resource unit (RU) allocation indication subfield, or a physical layer protocol data unit (PPDU) parameter subfield, the bandwidth indication subfield indicates a bandwidth applicable to the recommended EHT-MCS, the RU allocation indication subfield indicates a RU applicable to the recommended EHT-MCS, the PPDU parameter subfield indicates a type of a PPDU for parameter estimation, and one or more of the bandwidth indication subfield, the RU allocation indication subfield, or the PPDU parameter subfield meet the following conditions:

the bandwidth indicated by the bandwidth indication subfield is 320 megahertz, and the PPDU indicated by the PPDU parameter subfield comprises one or more of:

an EHT multi-user (MU) PPDU and an EHT trigger-based (TB) PPDU, or the RU indicated by the RU allocation indication subfield comprises one or more of:

an MRU comprising a 52-tone RU and a 26-tone RU, an MRU comprising a 106-tone RU and a 26-tone RU, an MRU comprising a 484-tone RU and a 242-tone RU, an MRU comprising a 996-tone RU and a 484-tone RU, an MRU comprising two 996-tone RUs and a 484-tone RU, an MRU comprising three 996-tone RUs, an MRU comprising three 996-tone RUs and a 484-tone RU, or an RU comprising four 996-tone RUs.

6. The EHT LA control information transmission method according to claim 5, wherein the control subfield in the first message further comprises an unsolicited MCS feedback subfield, and the unsolicited MCS feedback subfield indicates that a message carrying the unsolicited MCS feedback subfield is an unsolicited feedback message.

7. The EHT LA control information transmission method according to claim 5, wherein the PPDU parameter subfield further indicates a coding type, the type of the PPDU occupies 1 bit, and the coding type occupies 1 bit.

8. The EHT LA control information transmission method according to claim 7, wherein the PPDU parameter subfield and the MSI subfield are a same subfield in the control subfield.

9. The EHT LA control information transmission method according to claim 1, wherein a number of bits occupied by the number-of-spatial-streams subfield is 3, and the number of spatial streams indicated by the number-of-spatial-streams is any one of 1, 2, 4, 6, 8, 12, or 16.

10. The EHT LA control information transmission method according to claim 1, wherein a number of bits occupied by the number-of-spatial-streams subfield is 4, and the number of spatial streams indicated by the number-of-spatial-streams is any one of 1 to 15.

11. An extremely high throughput (EHT) link adaptation (LA) control information transmission apparatus, comprising:

a processor; and a memory having instructions stored thereon that, when executed by the processor, cause the EHT LA control information apparatus to:

send a first message, wherein the first message comprises a control field, the control field comprises a control subfield, the control subfield comprises:

a bandwidth indication subfield, a high efficiency (HE)/EHT indication subfield, a number-of-spatial-streams subfield, an EHT-modulation and coding scheme (MCS) subfield, and an MCS request sequence identifier (MSI) subfield, a quantity of bits occupied by the bandwidth indication subfield is 3, a quantity of bits occupied by the control subfield is not greater than 26, the HE/EHT indication subfield indicates that the control subfield is an HE link adaptation (HLA) control subfield or an EHT LA control subfield, the number-of-spatial-streams subfield indicates a recommended number of spatial streams, the EHT-MCS subfield indicates a recommended EHT-MCS, the bandwidth indication subfield is used to indicate a bandwidth to which the recommended EHT-MCS is applicable, the MSI subfield indicates an MCS request sequence, and an MCS indicated by the EHT-MCS subfield comprises one or more of:

binary phase shift keying (BPSK)-dual carrier modulation (DCM), or

BPSK-DCM-duplication (DUP).

12. The EHT LA control information transmission apparatus according to claim 11, wherein the MCS indicated by the EHT-MCS subfield further comprises 4096-quadrature amplitude modulation (QAM).

13. The EHT LA control information transmission apparatus according to claim 11, wherein the EHT LA control information transmission apparatus is further caused to:

receive a second message, wherein the second message comprises a control field, the control field in the second message comprises a control subfield, the control subfield in the second message comprises one or more of:

an EHT indication subfield, a bandwidth indication subfield, or a resource unit (RU) allocation indication subfield, the bandwidth indication subfield indicates a bandwidth applicable to the recommended EHT-MCS, the RU allocation indication subfield indicates a RU applicable to the recommended EHT-MCS, and one or more of the bandwidth indicated by the bandwidth indication subfield is 320 megahertz, or the RU indicated by the RU allocation indication subfield comprises one or more of:

an MRU comprising a 52-tone RU and a 26-tone RU, an MRU comprising a 106-tone RU and a 26-tone RU, an MRU comprising a 484-tone RU and a 242-tone RU, an MRU comprising a 996-tone RU and a 484-tone RU, an MRU comprising two 996-tone RUs and a 484-tone RU, an MRU comprising three 996-tone RUS, an MRU comprising three 996-tone RUs and a 484-tone RU, or an RU comprising four 996-tone RUs.

14. The EHT LA control information transmission apparatus according to claim 13, wherein the control subfield in the first message and the control subfield in the second message each further comprise an unsolicited MCS feedback subfield, the unsolicited MCS feedback subfield indicates that a message carrying the unsolicited MCS feedback subfield is a solicited feedback message, the first message further comprises an MCS request subfield, the MCS request subfield indicates that the first message is for responding to EHT LA feedback, the second message further comprises an MCS request subfield, and the MCS request subfield in the second message indicates that the second message is for requesting the EHT LA feedback.

15. The EHT LA control information transmission apparatus according to claim 11, wherein the control subfield further comprises one or more of:

a resource unit (RU) allocation indication subfield, or a physical layer protocol data unit (PPDU) parameter subfield, the bandwidth indication subfield indicates a bandwidth applicable to the recommended EHT-MCS, the RU allocation indication subfield indicates a RU applicable to the recommended EHT-MCS, the PPDU parameter subfield indicates a type of a PPDU for parameter estimation, and one or more of the bandwidth indication subfield, the RU allocation indication subfield, or the PPDU parameter subfield meet the following conditions:

the bandwidth indicated by the bandwidth indication subfield is 320 megahertz, and the PPDU indicated by the PPDU parameter subfield comprises one or more of:

an EHT multi-user (MU) PPDU and an EHT trigger-based (TB) PPDU, or the RU indicated by the RU allocation indication subfield comprises one or more of:

an MRU comprising a 52-tone RU and a 26-tone RU, an MRU comprising a 106-tone RU and a 26-tone RU, an MRU comprising a 484-tone RU and a 242-tone RU, an MRU comprising a 996-tone RU and a 484-tone RU, an MRU comprising two 996-tone RUs and a 484-tone RU, an MRU comprising three 996-tone RUs, an MRU comprising three 996-tone RUs and a 484-tone RU, or an RU comprising four 996-tone RUs.

16. The EHT LA control information transmission apparatus according to claim 15, wherein the control subfield in the first message further comprises an unsolicited MCS feedback subfield, and the unsolicited MCS feedback subfield indicates that a message carrying the unsolicited MCS feedback subfield is an unsolicited feedback message.

17. The EHT LA control information transmission apparatus according to claim 15, wherein the PPDU parameter subfield further indicates a coding type, the type of the PPDU occupies 1 bit, and the coding type occupies 1 bit.

18. The EHT LA control information transmission apparatus according to claim 17, wherein the PPDU parameter subfield and the MSI subfield are a same subfield in the control subfield.

19. A non-transitory computer-readable medium, having instructions stores thereon that, when executed by a processor, cause an extremely high throughput (EHT) link adaptation (LA) control information transmission apparatus to:

send a first message, wherein the first message comprises a control field, the control field comprises a control subfield, the control subfield comprises:

a bandwidth indication subfield, a high efficiency (HE)/EHT indication subfield, a number-of-spatial-streams subfield, an EHT-modulation and coding scheme (MCS) subfield, and an MCS request sequence identifier (MSI) subfield, a quantity of bits occupied by the bandwidth indication subfield is 3, a quantity of bits occupied by the control subfield is not greater than 26, the HE/EHT indication subfield indicates that the control subfield is an HE link adaptation (HLA) control subfield or an EHT LA control subfield, the number-of-spatial-streams subfield indicates a recommended number of spatial streams, the EHT-MCS subfield indicates a recommended EHT-MCS, the bandwidth indication subfield is used to indicate a bandwidth to which the recommended EHT-MCS is applicable, the MSI subfield indicates an MCS request sequence, and an MCS indicated by the EHT-MCS subfield comprises one or more of:

binary phase shift keying (BPSK)-dual carrier modulation (DCM), or

BPSK-DCM-duplication (DUP).

20. The non-transitory computer-readable medium according to claim 19, wherein the MCS indicated by the EHT-MCS subfield further comprises 4096-quadrature amplitude modulation (QAM).

* * * * *